(12) United States Patent  (10) Patent No.: US 10,185,459 B2
Gao et al.  (45) Date of Patent: Jan. 22, 2019

(54) DISPLAY PROCESSING METHOD, DISPLAY PROCESSING APPARATUS AND ELECTRONIC DEVICE

(71) Applicants: Beijing Lenovo Software Ltd., Haidian District, Beijing (CN); Lenovo (Beijing) Co., Ltd., Haidian District, Beijing (CN)

(72) Inventors: Yan Gao, Beijing (CN); Jie Xia, Beijing (CN); Xiaotian Zhu, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 269 days.

(21) Appl. No.: 14/984,440

(22) Filed: Dec. 30, 2015

(65) Prior Publication Data

US 2017/0090681 A1 Mar. 30, 2017

(30) Foreign Application Priority Data

Sep. 25, 2015 (CN) .......................... 2015 1 0623577

(51) Int. Cl.
*G06F 1/16* (2006.01)
*H04M 1/02* (2006.01)
(Continued)

(52) U.S. Cl.
CPC .......... *G06F 3/0481* (2013.01); *G06F 1/1652* (2013.01); *H04M 1/72519* (2013.01); *H04M 1/0268* (2013.01)

(58) Field of Classification Search
CPC .......................... G06Q 30/0283; G06F 1/1652
(Continued)

(56) References Cited

U.S. PATENT DOCUMENTS

2007/0097014 A1  5/2007  Solomon
2015/0042674 A1*  2/2015  Lin .......................... G09G 5/14
345/619

(Continued)

FOREIGN PATENT DOCUMENTS

CN  1960612  5/2007
CN  103761029  4/2014
(Continued)

OTHER PUBLICATIONS

First Office Action dated Sep. 20, 2017 (27 pages including English translation) out of Chinese priority Application 201510623577.2.

*Primary Examiner* — Cao H Nguyen
(74) *Attorney, Agent, or Firm* — Brinks Gilson & Lione; John C. Freeman

(57) ABSTRACT

A display processing method, a display processing apparatus and an electronic device are described. The display processing method includes obtaining information from a second application when an interface of a first application is displayed in a predetermined region of a display screen of a display device; displaying prompt information on the information, on the interface of the first application; receiving a first operation on the prompt information; dividing the predetermined region into a first region and a second region, in response to the first operation; and displaying at least a part of the interface of the first application in the first region, and displaying an interface of the second application in the second region, wherein the information is displayed in the interface of the second application.

11 Claims, 22 Drawing Sheets

(51) Int. Cl.
*H04M 1/725* (2006.01)
*G06F 3/0481* (2013.01)

(58) Field of Classification Search
USPC ................................ 715/771, 765, 780, 841
See application file for complete search history.

(56) References Cited

U.S. PATENT DOCUMENTS

2016/0357404 A1* 12/2016 Alonso Ruiz ......... G06F 3/0483
2017/0315694 A1* 11/2017 Alonso Ruiz ......... G06F 3/0482

FOREIGN PATENT DOCUMENTS

| CN | 204215671 U | 3/2015 |
| CN | 104898952 | 9/2015 |
| EP | 0 798 627 | 10/1997 |

\* cited by examiner

DISPLAY PROCESSING METHOD, DISPLAY PROCESSING APPARATUS AND ELECTRONIC DEVICE

This application claims priority to Chinese Patent Application No. 201510623577.2 filed Sep. 25, 2015, the entire contents of which are incorporated herein by reference.

The present disclosure relates to the display processing field, and particularly to a display processing method and a display processing apparatus.

BACKGROUND

Recently, with the increasingly spread of an electronic device with a large screen, information that can be displayed on the screen is increasing as well. For example, when an interface of a first application is being displayed on the electronic device, information from a second application may be received. At this time, in order to prompt a user in time, some electronic devices are designed to display prompt information on the second application on the display interface of the first application.

At this time, if the user wants to browse the details of the received information of the second application, usually, he/she needs to acquire the details by clicking the prompt information. However, in order not to affect the display of the first application, usually, a display region of the prompt information is designed to be small. Therefore, there may be a case in which it is difficult for the user to click the prompt information accurately and thus the number of error operation is increased.

SUMMARY

In view of the above, a display processing method, a display processing apparatus and an electronic device are provided in the present disclosure, which enables the user to switch the display screen of the electronic device to display the interface of both the first application and the second application with a simple and errorless operation, when the display screen of the electronic device displays the interface of the first application, thereby realizing a divisional screen display, and thereby, the operation is simplified while a brand new operation manner is provided, the operation accuracy is improved and the user experience is improved.

According to an embodiment of the present disclosure, a display processing method is provided, comprising: obtaining information from a second application when an interface of a first application is displayed in a predetermined region of a display screen of a display device; displaying prompt information on the information, on the interface of the first application; receiving a first operation on the prompt information; dividing the predetermined region into a first region and a second region, in response to the first operation; and displaying at least a part of the interface of the first application in the first region, and displaying an interface of the second application in the second region, wherein the information is displayed in the interface of the second application.

According to another embodiment of the present disclosure, a display processing apparatus is provided, comprising: a first receiving unit operative to obtain information from a second application when an interface of a first application is displayed in a predetermined region of a display screen of a display device; a first display processing unit operative to display prompt information on the information, on the interface of the first application; a second receiving unit operative to receive a first operation on the prompt information; a dividing unit operative to divide the predetermined region into a first region and a second region, in response to the first operation; and a second display processing unit operative to display at least a part of the interface of the first application in the first region, and to display an interface of the second application in the second region, wherein the information is displayed in the interface of the second application.

According to a further embodiment of the present disclosure, an electronic device is provided, comprising: a processor; a memory; computer program instructions stored in the memory, which, when executed by the processor, perform steps of: obtaining information from a second application when an interface of a first application is displayed in a predetermined region of a display screen of a display device; displaying prompt information on the information, on the interface of the first application; receiving a first operation on the prompt information; dividing the predetermined region into a first region and a second region, in response to the first operation; and displaying at least a part of the interface of the first application in the first region, and displaying an interface of the second application in the second region, wherein the information is displayed in the interface of the second application.

According to still a further embodiment, an electronic device is provided, comprising: a display operative to display an interface; a sensor operative to detect an input operation; and a processor operative to obtain information from a second application when an interface of a first application is displayed in a predetermined region of a display screen of a display device; to display prompt information on the information, on the interface of the first application; to divide the predetermined region into a first region and a second region, when the sensor obtains the input operation on the prompt information; and to control the display to display at least a part of the interface of the first application in the first region, and to display an interface of the second application in the second region, wherein the information is displayed in the interface of the second application.

According to still a further embodiment of the present disclosure, a computer program product is provided, comprising a computer readable storage medium having stored thereon computer program instructions, which, when executed by a computer, perform steps of: obtaining information from a second application when an interface of a first application is displayed in a predetermined region of a display screen of a display device; displaying prompt information on the information, on the interface of the first application; receiving a first operation on the prompt information; dividing the predetermined region into a first region and a second region, in response to the first operation; and displaying at least a part of the interface of the first application in the first region, and displaying an interface of the second application in the second region, wherein the information is displayed in the interface of the second application.

In the display processing method, the display processing apparatus and the electronic device according to the embodiments of the present disclosure, the user is enabled to divide the display screen of the electronic device into two regions to display the interface of the first application and the second application respectively with a simple operation having a high accuracy and complying with the user's cognitive habit, when the display screen of the electronic device displays the interface of the first application, and thereby, the operation is simplified while a brand new operation manner is provided, the operation accuracy is improved and the user experience is improved.

DETAILED DESCRIPTION

Hereinafter, the embodiments of the present disclosure will be described in detail with reference to the accompany drawings.

The display processing method according to the embodiment of the present disclosure may be applied to an electronic device such as a cell phone, a tablet, or the like. The electronic device has a display screen for displaying interfaces of various applications installed in the electronic device.

When the display processing method according to the embodiment of the present disclosure begins, an interface of a certain application, which is referred to as a first application hereinafter for distinction, is displayed in a predetermined region of a display screen of a display device. In an example, the predetermined region is a region other than edges on the display screen. In another example, the predetermined region is an entire display region of the display screen. Of course, those skilled in the art may understand that the above is only example. The predetermined region may be preset to be any proper region on the display screen and is not limited here.

Figure 1:
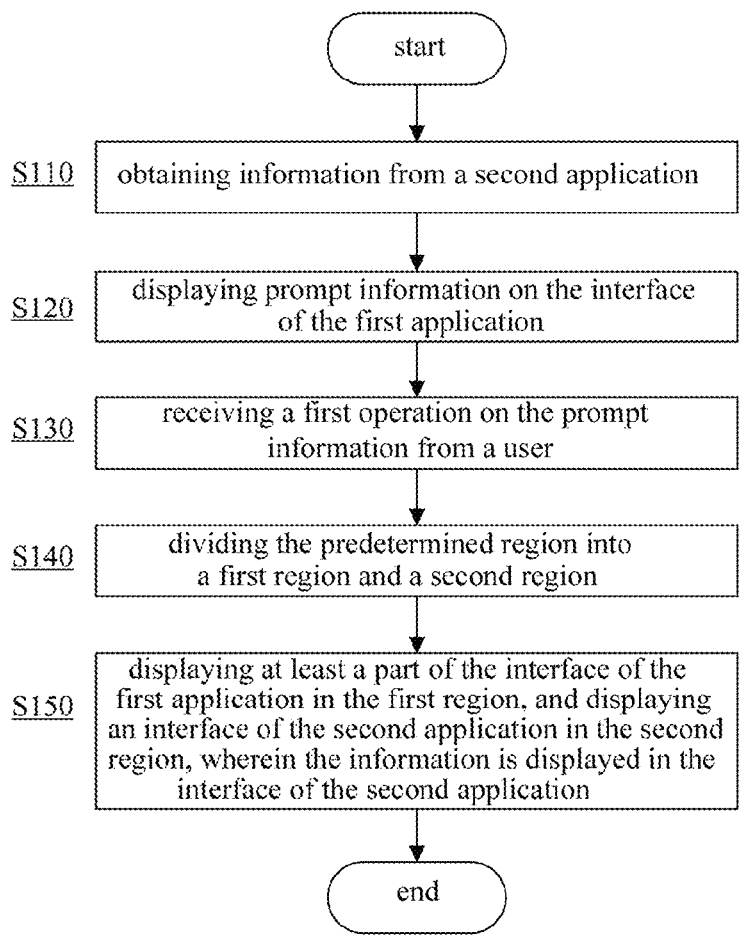
FIG. 1 is a flowchart showing a display processing method according to an embodiment of the present disclosure.

Hereinafter, the display processing method according to the embodiment of the present disclosure will be described in detail with reference to FIG. 1.

First, at a step S110, when an interface of a first application is displayed in a predetermined region of a display screen of a display device, information is obtained from a second application.

The second application is an application different from the first application. The information of the second application is, for example, push information from a server corresponding to the second application, or incoming information for communicating with the electronic device through the second application from another electronic device. For example, the first application is a video player application, and the second application is an instant message application, a telephone application or a social application. The information of the second application is, for example, a new message of the instant message application, a new incoming call of the telephone application, or a new change of a state of the social application, or the like.

Next, at a step 120, prompt information on the information is displayed on the interface of the first application.

Particularly, a prompt region may be preset in the predetermined region in the interface for displaying the first application, which is used to display prompt information from other applications.

More particularly, the first region and the second region as described below may be preset in the predetermined region. The size of the first region and the second region may be predetermined respectively, or may not be predetermined. The location of the first region with respect to the second region may be predetermined. The relative location means, for example, the arrangement direction between the first region and the second region. As an example, the arrangement direction between the first region and the second region may be preset as being perpendicular to the display direction of the display screen. Furthermore, the second region may be predetermined to be a region extended inwards from a first edge of the display screen.

For example, the display screen includes a long side and a short side, and the display screen is in a horizontal display state. In this case, the first region and the second region are preset to be, for example, arranged side by side or horizontally, and the second region is a region extended inwards from the short side of the display screen.

The prompt region may be arranged to be a region corresponding to the second region, for example, a region extended predetermined distance inwards from the first side of the display screen. The detail value of the predetermined distance is not limited. However, normally, the predetermined distance may be set to be relatively small, so that only a few characters can be displayed in the prompt region and the prompt region is smaller than the second region as described below.

Thereby, in the step S120, the prompt information is displayed on the prompt region determined as described above, for example.

Next, at a step S130, a first operation on the prompt information is received.

As a first example, a hardware switch may be predetermined on the electronic device. As the first operation, the user may trigger the hardware switch.

As a second example, the electronic device may be controlled by sound. As the first operation, the user may input a predetermined instruction such as "dividing the screen" by voice.

Figure 2A:
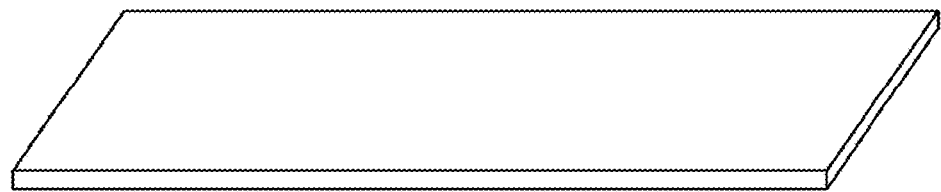
FIGS. 2A-2C schematically show different modes of a display screen of an electronic device according to an embodiment of the present disclosure, respectively.
Figure 2B:
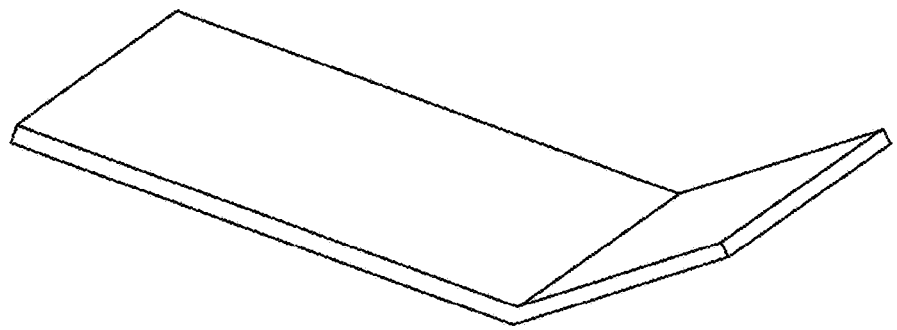

As a third example, the display screen has a planar mode and a first folding mode. FIGS. 2A and 2B show the two modes of the display screen. Particularly, FIG. 2A shows a state in which the display screen is in the planar mode, wherein the display is in the same plane as a whole. FIG. 2B shows a state in which the display screen is in the first folding state, wherein there is an angle between a plane where a certain end of the display screen, which is the left end in FIG. 2B, is located, and a plane where the opposite end, which is the right end in FIG. 2B is located. The angle is larger than a preset threshold, for example, 15 degrees, 20 degrees, or the like. Of course, the above is only an example. Those skilled in the rat may set the threshold properly according to requirement.

In this example, when the display screen is in the planar mode, information from the second application is obtained, and, in such step, the first folding operation for changing the display screen into the first folding mode is received.

That is, in this example, the display screen is foldable. There may be various ways to realize the display screen physically.

In a first implementation, the display may be a flexible display as a whole, which may be folded at at least one location. The implementation of the flexible screen is known to those skilled in the art, and will not be described here in detail.

In a second implementation, the electronic device comprises: a first body having a first surface and a second surface opposite to each other; a connecting body having a first surface and a second surface opposite to each other; a second body connected to the first body through the connecting body, which has a first surface and a second surface opposite to each other. The display screen is arranged on the first surface of the first body, the first surface of the connecting body and the first surface of the second body. In the planar mode, the first body, the connecting body and the second body are located in a same or nearly same plane. In the first folding mode, the first angle between a surface forming of the first surface of the first body and the first surface of the connecting body and the second body is larger than a threshold, the first region corresponds to the first surface of the first body and the first surface of the connecting body, and the second region corresponds to the first surface of the second body.

Hereinafter, the physical structure of the electronic device will be described in detail with reference to FIGS. 7-27.

It is to be noted that the first operation described above is only an example. Those skilled in the art may design other simple and errorless first operation complying with the user's cognitive habit on the basis of this.

Then, at a step S140, the predetermined region is divided into a first region and a second region, in response to the first operation; and at a step S150, at least a part of the interface of the first application is displayed in the first region, and an interface of the second application is displayed in the second region, wherein the information is displayed in the interface of the second application.

Particularly, as a first example, the sizes and the relative locations of the first region and the second region may be predetermined. Thereby, the predetermine region is divided into the predetermined first region and the predetermined second region in response to the first operation.

As a second example, in the display screen as shown in FIGS. 2A and 2B, the predetermined region may be divided into the first region and the second region, with a first folding location of the first folding operation as a boundary, and at least a part of the interface of the first application and the interface of the second application are displayed in the first region and the second region, respectively.

Thereby, the display region displaying only the interface of the first application originally may be divided into the first region displaying at least a part of the interface of the first application and a second region displaying the interface of the second application, in response to the user's operation. Furthermore, in such process, the user may perceive intuitionally that the display of the display screen is divided into two parts in response to his/her folding operation, the operation is simple and complied with the user's cognitive habit, and an error operation will hardly occur.

Figure 2C:
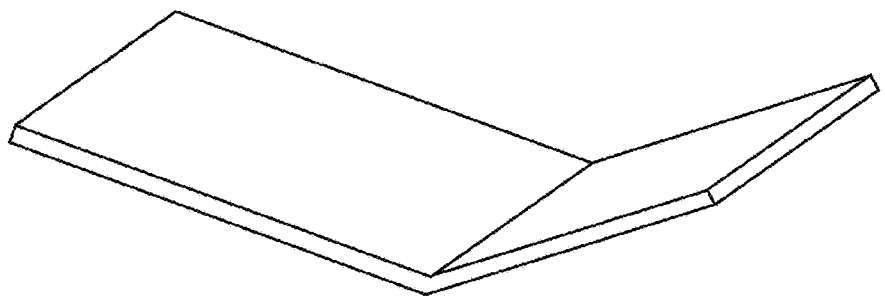

In another embodiment, the display screen further has a second folding mode. FIG. 2C shows a state in which the display screen is in the second folding mode. As shown in FIG. 2C, the folding direction of the second folding mode is the same as that of the first folding mode. That is, similarly, there is an angle between a plane where a certain end of the display screen, which is the left end in FIG. 2C, is located, and a plane where the opposite end, which is the right end in FIG. 2C is located. The angle is larger than a preset threshold. By comparing FIG. 2B with FIG. 2C, it may be known that the difference between the second folding mode and the first folding mode lies in that the folding location of the second folding mode and the folding location of the first folding mode are different. For example, the area of the plane where the left end of the display screen is located in FIG. 2B is larger than that in FIG. 2C.

Thereby, at the step S130, one of the first folding operation of changing the display screen into the first folding mode and a second folding operation of changing the display screen into the second folding mode may be received.

Thereby, the predetermined region is divided into the first region and the second region, with a first folding location of the first folding operation as a boundary, when receiving the first folding operation. On the other hand, the predetermined region is divided into the first region and the second region, with a second folding location of the second folding operation as a boundary, when receiving the second folding operation.

Thereby, the display screen may be divided into the first region and the second region with different sizes for displaying at least a part of the interface of the first application and the interface of the second application respectively, in response to the user's different folding operations, so that the user may perform corresponding folding operation according to the desired sizes allocated to the display for the first application and the second application.

In a further example, not only the single screen display may be switched into a divisional screen display in response to the user's first operation, but also the divisional screen display may be then switched back to the single screen display in response to the user's second operation.

Particularly, in a first example, after displaying at least a part of the interface of the first application in the first region, and displaying the interface of the second application in the second region, a third folding operation of changing the display screen from the first folding mode back into the planar mode may be received, as the second operation described above. The folding direction of the third folding operation is opposite to that of the first folding operation. Thereby, the display screen is switched back into the planar mode and the at least one part of the interface of the first application is displayed in the predetermined region, in response to the third folding operation.

That is, in this example, the display of the display screen of the electronic device is changed in synchronization with the physical mode of the display screen. When the display is changed to the first folding mode from the planar mode, the display region for displaying only the interface of the first application originally is divided into the first region for displaying at least a part of the interface of the first application and a second region for displaying the interface of the second application. On the other hand, when the display screen is changed from the first folding mode back to the planar mode, the display screen is restored to display the at least one part of the interface of the first application only. Furthermore, in such process, the user may perceive intuitionally that the display of the display screen is divided into two parts in response to his/her folding operation, and restored the original display in response to his/her folding operation in the opposite direction, the operation is simple and complied with the user's cognitive habit, and an error operation will hardly occur.

In a second example, after displaying at least a part of the interface of the first application in the first region, and displaying the interface of the second application in the second region, similarly, a third folding operation of changing the display screen from the first folding mode back into the planar mode is received. The folding direction of the third folding operation is opposite to that of the first folding operation. Furthermore, the display screen back is changed back into the planar mode.

Different from the above first example, although the display screen is changed to the planar mode, the at least one part of the interface of the first application is remained to be displayed in the first region and the interface of the second application is remained to be displayed in the second region.

After restoring the display screen to the planar mode, when receiving a second operation from the user, the interface of the first application is displayed in the predetermined region, in response to the second operation. The second operation is a different operation from the first operation, which is not limited here. For example, when the first operation is a first folding operation, the second operation may be a voice input operation or a press operation, or the like.

That is, in such example, in the opposite folding process, the display of the display screen of the electronic device is not changed in synchronization with the physical mode of the display screen. Even though the display screen is restored to the planar mode, if no additional operation is received from the user, it still remains to display the at least one part of the interface of the first application in the first region and display the interface of the second application in the second region. Considering the direction of the user's view sight, browsing both regions in the planar mode simultaneously is more comfortable than browsing both regions in the first folding mode, the display processing method in this example is more advantageous in the user browsing the interfaces of the two applications at the same time.

Figure 3A:
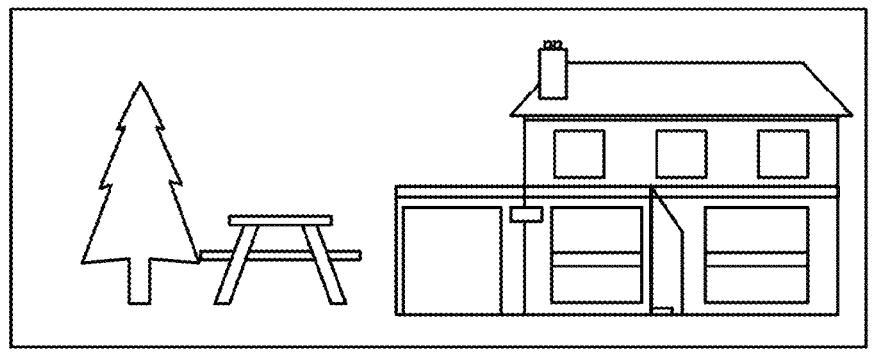
FIGS. 3A-3D are schematic display diagram of the display screen of the electronic device to which the display processing method according to the embodiment of the present disclosure is applied.

FIGS. 3A-3D are schematic diagrams showing display screens of the electronic device to which the display processing method according to the embodiment of the present disclosure is applied. As shown in FIG. 3A, the interface of the first application, for example, a video player application, is displayed on the predetermined region, which is the whole display screen in the present example, of the display screen of the electronic device. At this time, the display screen is in the planar mode.

Figure 3B:
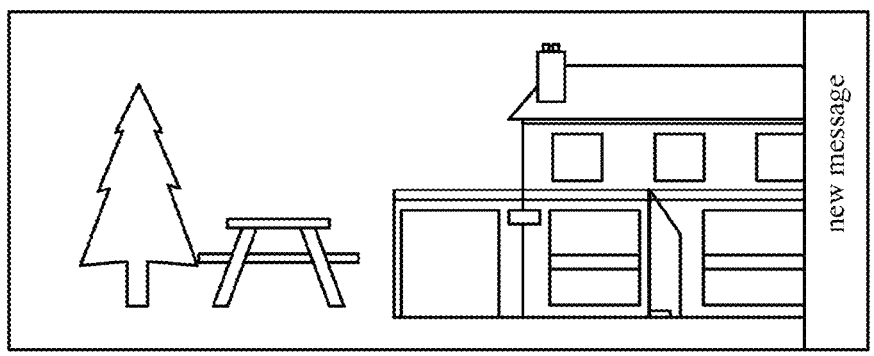

In this state, when information of the second application, for example, the short message application, is obtained, the prompt information on the information is displayed on a predetermined prompt region of the interface of the first application, as shown in FIG. 3B. The prompt information may be presented in various ways. In a first example, as shown in FIG. 3B, the thumbnail information of the information is overlapped with the display of the interface of the first application, as the prompt information. In a second example, as the prompt information, prompt identification on the information may be overlapped with the display of the first application, for example, a pattern for prompting folding. In a third example, a specific display effect may be rendered on the interface of the first application, for example, the right edge is displayed in flicker or a specific color, or the like.

Then, a first operation, for example, the first folding operation as described above, on the prompt information is received. In response to the first operation, the predetermined region is divided into the first region and the second region, and at least one part of the interface of the first region is displayed in the first region, and the interface of the second application is displayed in the second region, wherein the information is displayed in the interface of the second application.

Figure 3C:
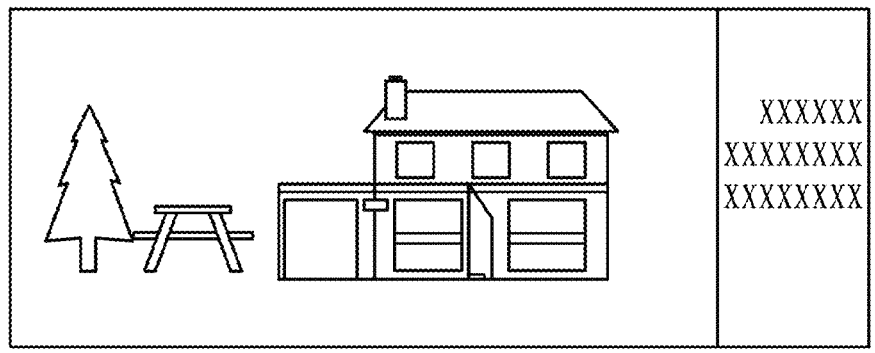

Particularly, in the first example, when information from the second application is obtained, the interface of the first application is displayed in the whole display region with a first proportion adapted with the proportion of the whole display region. When the display region is divided into the first region and the second region, the interface of the first region is displayed in the first region with the second proportion adapted with the proportion of the first region, and the interface of the second application is displayed in the second region, as shown in FIG. 3C. That is, in this example, the interface of the first application is zoomed out proportionally. Thereby, even if it is divided into the first region and the second region for display, the user can view the whole interface of the first application, without any missing of the display content displayed in the second region originally.

Figure 3D:
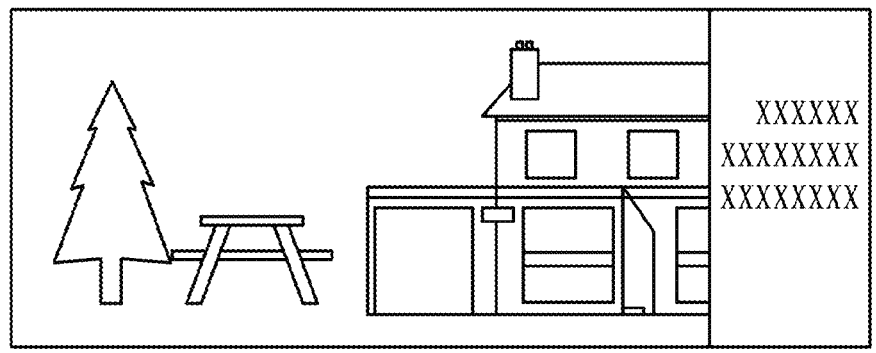

In a second example, the interface of the first application is displayed in the whole display region with a first proportion adapted with the proportion of the whole display region. When the display region is divided into the first region and the second region, the interface of the second application is overlapped with the interface of the first application displayed on the whole display region with the first proportion, so that at least a part of the interface of the first application is displayed in the first region, as shown in FIG. 3D. Thereby, even if it is divided into the first region and the second region for display, the user can view the interface of the first application continually with the original proportion, without any missing of display details due to the reduced proportion.

The display processing method according to the embodiment of the present disclosure has been described above in detail with reference to FIGS. 1-3.

In the display processing method according to the embodiment of the present disclosure, when the interface of the first application is displayed in the display screen of the electronic device, the user may divide the display screen into two regions with very simple, accurate operation which is complied with the user's cognitive habits, to display the interfaces of the first application and the second application respectively, thereby, the operation is simplified while a novel manipulation manner is provided, the operation accuracy is improved and the user experience is improved.

Hereinafter, the display processing apparatus according to the embodiment of the present disclosure will be described with reference to FIG. 4.

Figure 4:
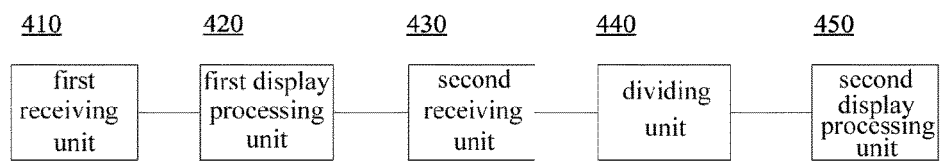
FIG. 4 is a diagram showing a main configuration of a display processing apparatus according to an embodiment of the present disclosure.

FIG. 4 is a diagram showing a main configuration of a display processing apparatus according to the embodiment of the present disclosure.

As shown in FIG. 4, the display processing apparatus 400 according to the embodiment of the present disclosure mainly includes: a first receiving unit 410, a first display processing unit 420, a second receiving unit 430, a dividing unit 440 and a second display processing unit 450.

The first receiving unit 410 is operative to obtain information from a second application when an interface of a first application is displayed in a predetermined region of a display screen of a display device.

The first display processing unit 420 is operative to display prompt information on the information, on the interface of the first application.

The second receiving unit 430 is operative to receive a first operation on the prompt information.

The dividing unit 440 is operative to divide the predetermined region into a first region and a second region, in response to the first operation.

The second display processing unit 450 is operative to display at least a part of the interface of the first application in the first region, and display an interface of the second application in the second region, wherein the information is displayed in the interface of the second application.

In an embodiment, the display screen has a planar mode and a first folding mode, the first receiving unit 410 is operative to obtain the information from the second application when the display screen is in the planar mode; the second receiving unit 430 is operative to receive a first folding operation of changing the display screen into the first folding mode.

In another embodiment, the dividing unit 440 is operative to divide the predetermined region into the first region and the second region, with a first folding location of the first folding operation as a boundary.

In a further embodiment, the display screen further has a second folding mode the folding direction of which is the same as that of the first folding mode; the first receiving unit 410 is operative to receive one of the first folding operation of changing the display screen into the first folding mode and a second folding operation of changing the display screen into the second folding mode; and the second receiving unit 430 is operative to divide the predetermined region into the first region and the second region, with a first folding location of the first folding operation as a boundary, when receiving the first folding operation; to divide the predetermined region into the first region and the second region, with a second folding location of the second folding operation as a boundary, when receiving the second folding operation.

In still a further embodiment, the display processing apparatus 400 further includes a third receiving unit operative to receive a third folding operation of changing the display screen from the first folding mode back into the planar mode, after displaying at least a part of the interface of the first application in the first region, and displaying the interface of the second application in the second region, a folding direction of the third folding operation being the opposite to that of the first folding operation; and a changing unit operative to change the display screen back into the planar mode and displaying the at least a part of the interface of the first application in the predetermined region, in response to the third folding operation.

In still a further embodiment, the display processing apparatus 400 further includes a third receiving unit operative to receive a third folding operation of changing the display screen from the first folding mode back into the planar mode, after displaying at least a part of the interface of the first application in the first region, and displaying the interface of the second application in the second region, a folding direction of the third folding operation being opposite to that of the first folding operation; and a changing unit operative to change the display screen back into the planar mode and remain to display the at least a part of the interface of the first application in the first region and display the interface of the second application in the second region, in response to the third folding operation; a fourth receiving unit operative to receive a second operation; and a third display processing unit operative to display the interface of the first application in the predetermined region, in response to the second operation.

In still a further embodiment, the relative location relationship between the first region and the second region is preset, and the second region is preset to be a region extended inwards from a first side of the display screen, the first display processing unit 420 is operative to display the prompt information on the information, at a location corresponding to the preset second region, on the interface of the first application.

In still a further embodiment, the first region and the second region are prearranged in a direction perpendicular to a display direction of the display screen.

In still a further embodiment, when information from the second application is obtained, the interface of the first application is displayed in the whole display region with a first proportion adapted with the proportion of the whole display region. The second display processing unit 450 is operative to display the interface of the first region in the first region with the second proportion adapted with the proportion of the first region, and display the interface of the second application in the second region.

In still a further embodiment, when information from the second application is obtained, the interface of the first application is displayed in the whole display region with a first proportion adapted with the proportion of the whole display region. The second display processing unit 450 is operative to overlap the interface of the second application with the interface of the first application displayed on the whole display region with the first proportion, so that at least a part of the interface of the first application is displayed in the first region.

In still a further embodiment, the first display processing unit 420 is operative to perform at least one of: overlapping a prompt identification of the information on the interface of the first application as the prompt information; overlapping thumbnail information of the information on the interface of the first application as the prompt information; rendering a specific display effect on the interface of the first application as the prompt information.

In still a further embodiment, the electronic device includes: a first body having a first surface and a second surface opposite to each other; a connecting body having a first surface and a second surface opposite to each other; a second body connected to the first body through the connecting body, which has a first surface and a second surface opposite to each other; the display screen is arranged on the first surface of the first body, the first surface of the connecting body and the first surface of the second body; the processor and the memory are arranged on anyone of the first body, the connecting body and the second body, respectively; the first body, the connecting body and the second body are located in a same or nearly same plane in the planar mode; in the first folding mode, the first angle between a surface forming of the first surface of the first body and the first surface of the connecting body and the second body is larger than a threshold, the first region corresponds to the first surface of the first body and the first surface of the connecting body, and the second region corresponds to the first surface of the second body.

In still a further embodiment, the display screen further has a second folding mode, a folding direction of which is the same as that of the first folding mode; in the second folding mode, the first angle between a surface forming of the first surface of the connecting body and the first surface of the second body, and the first body is larger the a threshold, the first region corresponds to the first surface of the first body, and the second region corresponds to first surface of the second body and the first surface of the connecting body.

The display processing apparatus according to the embodiment of the present disclosure has been described above with reference to FIG. 4.

In the display processing apparatus according to the embodiment of the present disclosure, when the interface of the first application is displayed in the display screen of the electronic device, the user may divide the display screen into two regions with very simple, accurate operation which is complied with the user's cognitive habits, to display the interfaces of the first application and the second application respectively, thereby, the operation is simplified while a novel manipulation manner is provided, the operation accuracy is improved and the user experience is improved.

Hereinafter, the electronic device according to the embodiment of the present disclosure will be described with reference to FIG. 5.

Figure 5:
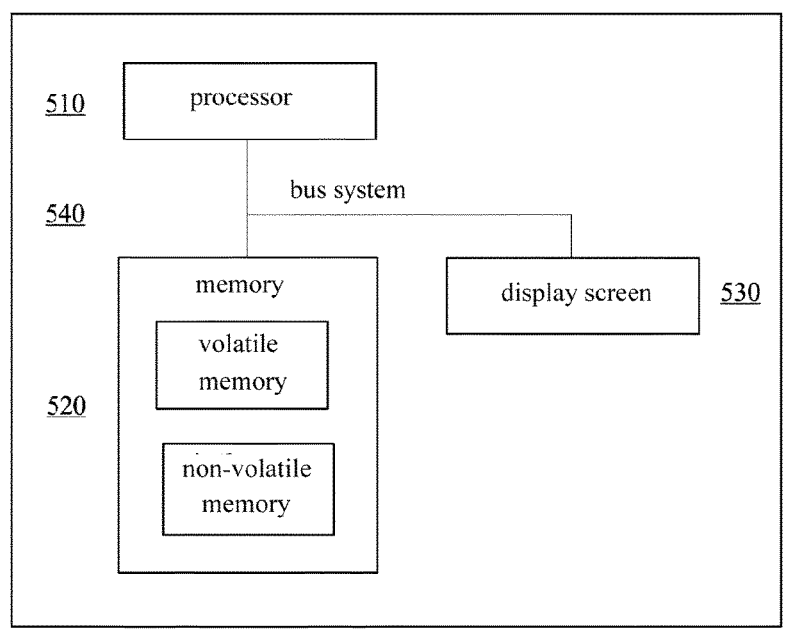
FIG. 5 is a block diagram showing a main configuration of an electronic device according to an embodiment of the present disclosure.

As shown in FIG. 5, the electronic device 500 according to the embodiment of the present disclosure mainly includes one or more processor(s) 510, one or more memory (memories) 520 and a display screen 530. These components are interconnected with each other through a bus system 540 and/or a connection mechanism in other forms (not shown). It should be noted that the components and the structure of the electronic device 500 as shown in FIG. 5 are only exemplarily but not limiting, and the electronic device 500 may comprise other components with other structures when necessary.

The processor 510 may be a Central Processing Unit (CPU) or a processing unit in other forms having a data processing capability and/or an instruction execution capability, and may control other components in the electronic device 500 to perform a desired function.

The memory 520 may include one or more computer program product(s) which may include computer readable storage media in various forms, for example, a volatile memory and/or a non-volatile memory. The volatile memory may, for example, include a Random Access Memory (RAM) and/or a cache memory (cache) or the like. The non-volatile memory may, for example, include a Read Only Memory (ROM), a hard disk, a flash memory or the like. There may be one or more computer program instructions stored on the computer readable storage media, which may be executed by the processor 510 so as to implement respective functions and/or other desired functions of the display processing method of an embodiment of the present disclosure as described hereinafter.

In an embodiment, the display screen has a planar mode and a first folding mode; the step of obtaining information from the second application comprises: obtaining information from the second application when the display screen is in the planar mode; the step of receiving the first operation on the prompt information comprises: receiving a first folding operation of changing the display screen into the first folding mode.

In another embodiment, the electronic device further comprises: a first body having a first surface and a second surface opposite to each other; a connecting body having a first surface and a second surface opposite to each other; a second body connected to the first body through the connecting body, which has a first surface and a second surface opposite to each other; the display screen is arranged on the first surface of the first body, the first surface of the connecting body and the first surface of the second body; the processor and the memory are arranged on anyone of the first body, the connecting body and the second body, respectively; the first body, the connecting body and the second body are located in a same or nearly same plane in the planar mode; in the first folding mode, the first angle between a surface forming of the first surface of the first body and the first surface of the connecting body, and the second body is larger than a threshold, the first region corresponds to the first surface of the first body and the first surface of the connecting body, and the second region corresponds to the first surface of the second body.

In a further embodiment, the display screen further has a second folding mode, a folding direction of which is the same as that of the first folding mode; in the second folding mode, the first angle between a surface forming of the first surface of the connecting body and the first surface of the second body, and the first body is larger the a threshold, the first region corresponds to the first surface of the first body, and the second region corresponds to first surface of the second body and the first surface of the connecting body.

Figure 6:
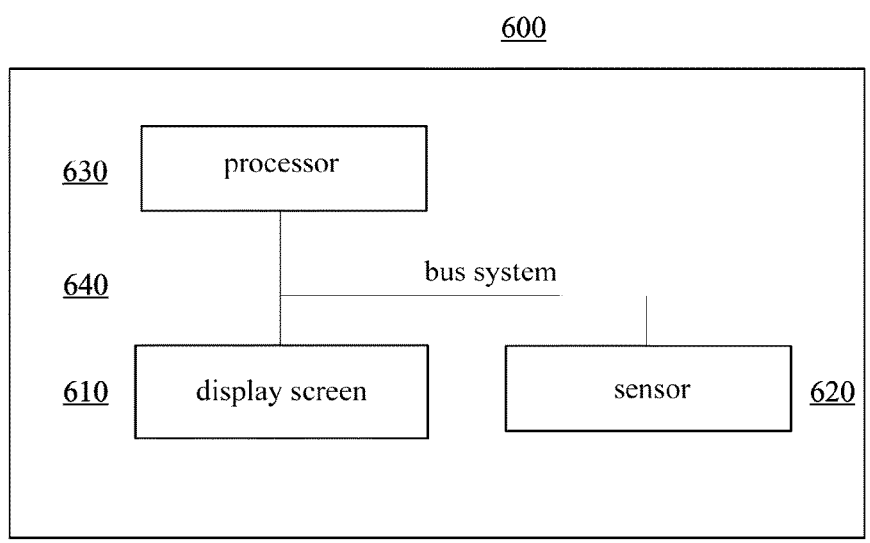
FIG. 6 is a block diagram showing a main configuration of an electronic device according to another embodiment of the present disclosure.

FIG. 6 is a block diagram showing a main configuration of an electronic device according to another embodiment of the present disclosure.

As shown in FIG. 6, the electronic device 600 according to the embodiment of the present disclosure comprises: a display 610, a sensor 620 and a processor 630, connected with each other through a bus system 640 and/or other connection mechanism not shown.

The display 610 is operative to display an interface. The sensor 620 is operative to detect an input operation. The processor 630 is operative to obtain information from a second application when an interface of a first application is displayed in a predetermined region of a display screen of a display device; to display prompt information on the information, on the interface of the first application; to divide the predetermined region into a first region and a second region, when the sensor obtains the input operation on the prompt information; and to control the display to display at least a part of the interface of the first application in the first region, and displaying an interface of the second application in the second region, wherein the information is displayed in the interface of the second application.

In an embodiment, the display screen has a planar mode in which a display surface of the display screen is in a planar or nearly planar state, and a first folding mode in which the display surface of the display screen has a first angle; the sensor is operable to detect the switch of the display screen between the planar mode and the folding mode; the obtaining the information from the second application comprising: obtaining the information from the second application when the display screen is in the planar mode; the receiving the first operation on the prompt information comprises: receiving a first folding operation of changing the display screen into the first folding mode.

In another embodiment, the electronic device further comprises: a first body having a first surface and a second surface opposite to each other; a connecting body having a first surface and a second surface opposite to each other; a second body connected to the first body through the connecting body, which has a first surface and a second surface opposite to each other; the display screen is arranged on the first surface of the first body, the first surface of the connecting body and the first surface of the second body; the processor and the memory are arranged on anyone of the first body, the connecting body and the second body, respectively; the first body, the connecting body and the second body are located in a same or nearly same plane in the planar mode; in the first folding mode, the first angle between a surface forming of the first surface of the first body and the first surface of the connecting body, and the second body is larger than a threshold, the first region corresponds to the first surface of the first body and the first surface of the connecting body, and the second region corresponds to the first surface of the second body.

In another embodiment, the display screen further has a second folding mode, a folding direction of which is the same as that of the first folding mode; in the second folding mode, the first angle between a surface forming of the first surface of the connecting body and the first surface of the second body, and the first body is larger the a threshold, the first region corresponds to the first surface of the first body, and the second region corresponds to first surface of the second body and the first surface of the connecting body.

The electronic devices according to the embodiment of the present disclosure have been described above with references to FIGS. 5-6. In the electronic device according to the embodiment of the present disclosure, when the interface of the first application is displayed in the display screen of the electronic device, the user may divide the display screen into two regions with very simple, accurate operation which is complied with the user's cognitive habits, to display the interfaces of the first application and the second application respectively, thereby, the operation is simplified while a novel manipulation manner is provided, the operation accuracy is improved and the user experience is improved.

Hereinafter, the detailed physical structure of the electronic device according to the embodiment of the present disclosure will be described.

Figure 7:
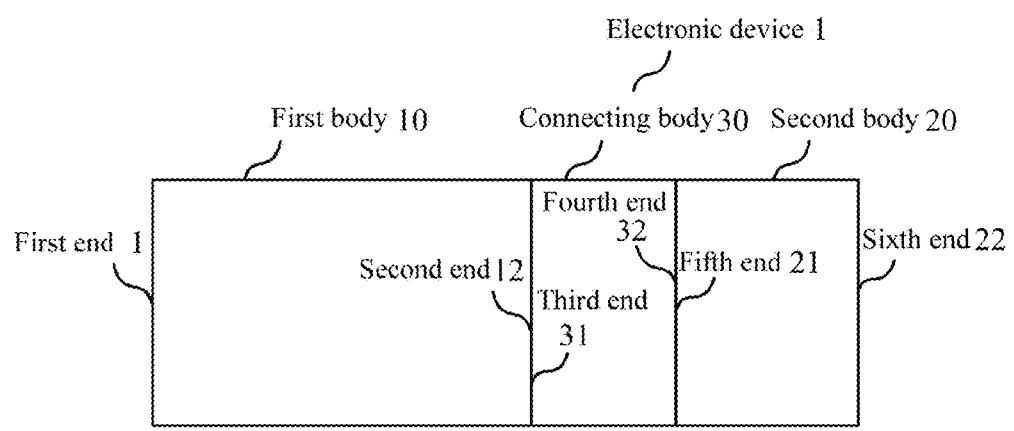
FIG. 7 is a schematic diagram of an electronic device according to an embodiment of the present disclosure.

FIG. 7 is a diagram illustrating an electronic device according to an embodiment of the present disclosure. The electronic device 1 according to an embodiment of the present disclosure may be such an electronic device like tablet computer, smart phone, personal digital assistant, smart wearable device. In the following, for convenience of description, the smart phone will be described as an example of the electronic device.

As shown in FIG. 7, the electronic device 1 according to an embodiment of the present disclosure comprises a first body 10, a second body 20, and a connecting body 30. In other words, the section other than the first body 10 and the second body 20 in the electronic device 1 is the connecting body 30. The first body 10 has a first end 11 and a second end 12; the connecting body 30 has a third end 31 and a fourth end 32, the third end 31 is connected to the second end 12; the second body 20 has a fifth end 21 and a sixth end 22, the fifth end 21 is connected to the fourth end 32, the second body 20 is at least capable of rotating relative to the first body 10 based on the connecting body 30.

Configuration of the connecting body 30 will be described below in detail, the connecting body 30 may be composed by a plurality of rotary members and a non-rotary member therein between, wherein rotary members that implement a connection between the connecting body 30 and the first body 10 and a connection between the connecting body 30 and the second body 20 will be uniformly considered to a compose member of the connecting body 30. In other words, the section other than the first body 10 and the second body 20 in the electronic device 1 is all considered as the connecting body 30. In addition, it should be noted that the term "end" used herein refers to a part in a certain range of respective end surfaces of the first body 10, the second body 20, and the connecting body 30.

Configuration of the connecting body 30 of the electronic device 1 and a mode switching process of the electronic device 1 in a case where the second body 20 at least rotates relative to the first body 10 based on the connecting body 30 will be further described below in detail with reference to the accompanying drawings.

Figure 8A:
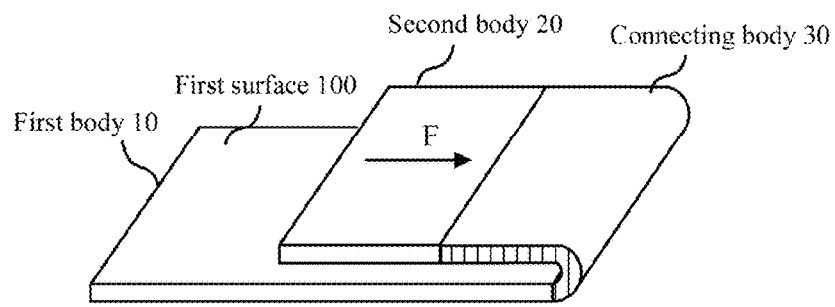
FIGS. 8A to 8C are schematic diagrams illustrating a switching process between a first mode and a second mode of the electronic device according to a first embodiment of the present disclosure.
Figure 8B:
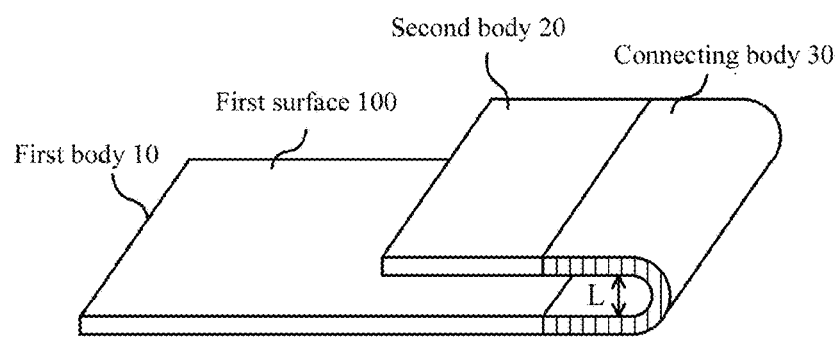
Figure 8C:
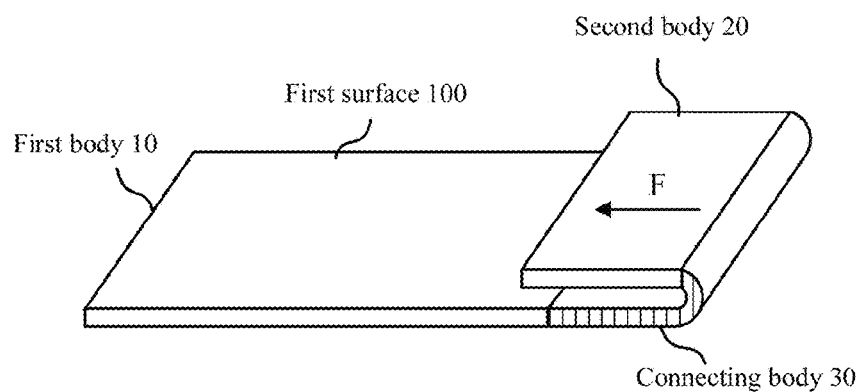

FIGS. 8A to 8C are schematic diagrams illustrating a switching process between a first mode and a second mode of the electronic device according to a first embodiment of the present disclosure. FIG. 8A illustrates the first mode of the electronic device according to the first embodiment of the present disclosure, FIG. 8C illustrates the second mode of the electronic device according to the first embodiment of the present disclosure, and FIG. 8B illustrates an arbitrary mode during a switching process between the first mode and the second mode according to the first embodiment of the present disclosure.

As shown in FIG. 8A, in the first mode, a first surface 100 of the first body 10 is covered by the connecting body 30 and the second body 20. As shown in FIG. 8C, in the second mode, a surface composed by the first surface 100 of the first body 10 and a first surface 300 of the connecting body 30 is covered by the second body 20. As will be appreciated that, coverage in the first mode and the second mode comprises a total coverage and a partial coverage. When the second body 20 is short enough, in the second mode shown in FIG. 8C, a surface composed by the first surface 100 of the first body 10 and a first surface 300 of the connecting body 30 being covered by the second body 20 may be that the second body 20 covers only the first surface 300 of the connecting body 30.

As shown in FIG. 8B, in an arbitrary mode in a switching process between the first mode and the second mode, because there is damping between respective members that compose the connecting body 30, so the arbitrary mode is a mode that can maintain stable without an external force. Based on the same reasons, in this case, the first mode and the second mode also are modes that can maintain stable without an external force. The present disclosure is not limited thereto, the first mode, the second mode, and the arbitrary mode during a switching process between the first mode and the second mode may probably be modes that require an external force to maintain stable. Configuration of the connecting body 30 will be described below in detail with reference to the accompanying drawings.

In addition, as shown in FIGS. 8A to 8C, in the first mode and the second mode, a maximum distance between corresponding points of the first body 10 and the second body 20 is less than a first predetermined threshold L. As will be appreciated, the corresponding points of the first body 10 and the second body 20 are a pair of intersection points of a straight line that vertically passes through a plane where the first body 10 and the second body 20 reside on the aforesaid plane. In the electronic device according to the first embodiment of the present disclosure as shown in FIGS. 8A to 8C, the first body 10 and the second body 20 are capable of being in an approximate fitting in the first mode, the second mode, and an arbitrary state between the two. That is, the first threshold L may be 5 mm or less.

In one case, in a process that the electronic device switches from the first mode to the second mode through the arbitrary mode, a distance between the sixth end 22 of the second body 20 and the first surface 100 of the first body 10 is maintained as smaller than the first predetermined threshold. The distance between the sixth end 22 of the second body 20 and the first surface 100 is a distance between any point on the sixth end 22 and a corresponding point on the first body 10.

In another case, when switching between the first mode and the second mode, a distance between the first surface 100 of the first body 10 and a first surface 200 of the second body 20 is also smaller than the first predetermined threshold. That is to say, in this case, the first body 10 and the second body 20, on the whole, slide relatively in parallel to execute mode switching. In the following, configuration of the connecting body 30 will be described with reference to the accompanying drawing to illustrate correspondence between a different mode switching process and configuration of the connecting body 30.

In addition, in the mode switching process shown in FIGS. 8A to 8C, an external force needs to be applied on the electronic device. In the first mode shown in FIG. 8A, when an external force F that has a component in a direction from the sixth end 22 to the fifth end 21 is applied on the second body 20, and a magnitude of the component of the external force satisfies a first predetermined condition, the electronic device switches from the first mode to the second mode. Likewise, in the second mode shown in FIG. 8C, when an external force F that has a component in a direction from the fifth end 21 to the sixth end 22 is applied on the second body 20, and a magnitude of the component of the external force satisfies a first predetermined condition, the electronic device switches from the second mode to the first mode. As will be appreciated, the external force applied on the second body 20 of the electronic device is transmitted to the connecting body 30 to overcome the damping between respective members of the connecting body 30. Configuration of the connecting body 30 will be described below with reference to the accompanying drawing, to illustrate correspondence between the force that causes a mode switching to the electronic device and the configuration of the connecting body 30.

Figure 9:
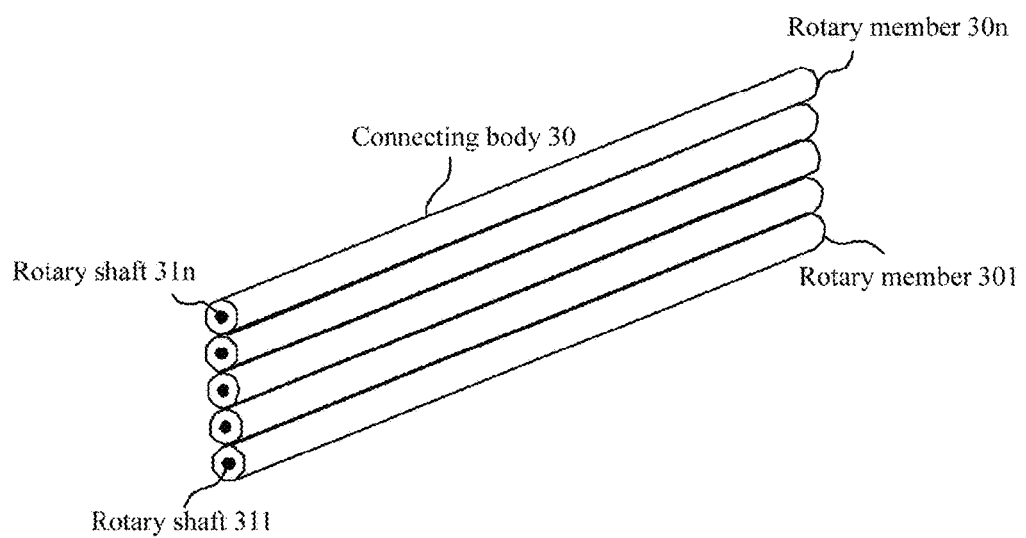
FIG. 9 is a schematic diagram further illustrating the connecting body according to the first embodiment of the present disclosure.

FIG. 9 is a schematic diagram further illustrating the connecting body according to the first embodiment of the present disclosure. As shown in FIG. 9, the connecting body 30 according to the first embodiment of the present disclosure may comprise at least three rotary members 301-30$n$ ($n$ is an integer larger than or equal to 3), each of the at least three rotary members 301-30$n$ has a self-rotary shaft 311-31$n$, respective self-rotary shafts 311-31$n$ of the at least three rotary members 301-30$n$ are parallel to each other. For example, when an external force applied on one rotary member 301 is vertical to the self-rotary shaft 311 thereof and a magnitude of a component in a direction tangential to an outer surface of the one rotary member 301 satisfies a second predetermined condition, the one rotary member 301 can rotate around the self-rotary shaft 311 thereof. Here, the second predetermined condition is associated with manufacturing material, manufacturing process and other factors of the at least three rotary members 301-30$n$. In addition, when there is no external force that satisfies the second predetermined condition on each of the at least three rotary members 301-30$n$, the at least three rotary members may 301-30$n$ probably maintain a mutual stability due to the damping, so as to ensure a relative stable state between the first body 10, the second body 20, and the connecting body 30 of the electronic device 1.

As shown above with reference to FIGS. 8A to 8C, the external force applied on the second body 20 is for making at least one rotary member in the connecting body 30 satisfy the aforesaid second predetermined condition and thereby rotate around the self-rotary shaft thereof. Since in a process of transmitting the external force applied on the second body 20 to at least one rotary member in the connecting body 30, there may be a direction difference (that is, the direction from the sixth end 22 to the fifth end 21 may probably be different than the direction vertical to the self-rotary shaft thereof and tangential to an outer surface of the one rotary member) or other loss, the first predetermined condition may be larger than the second predetermined condition.

Furthermore, in the first embodiment of the present disclosure, the connecting body 30 according to the first embodiment of the present disclosure may be composed only by the at least three rotary members 301-30n. In addition, in an example of the first embodiment of the present disclosure, when one rotary member (e.g., rotary member 301) rotates, the other rotary members (rotary members 302-30n) rotate accordingly. For example, the at least three rotary members 301-30n are gear members that engage with each other, when one gear member rotates, it will drive all other gear members that engage to rotate in linkage with the same line speed (with the same angular velocity in the case of the same radius). Alternatively, when all the rotary members rotate in linkage, rotation speeds of the respective rotary members (line speed and/or angular velocity) may probably be different due to different engagement manners and different friction and consumption of the respective rotary members. In addition, in another example of the first embodiment of the present disclosure, when one rotary member (e.g., rotary member 301) rotates, at least one of the other rotary members does not rotate, that is, not all the rotary members are in linkage, instead, there is at least one rotary member that is not in linkage.

In a case where all the rotary members of the connecting body 30 are in linkage, because rotation of one rotary member causes all the other rotary members to rotate at the same or different rotation speed, so in the mode switching process shown in FIGS. 8A to 8C, the first body 10 and the second body 20, on a whole, cannot maintain sliding in parallel, instead, there is a fluctuation due to the rotation of all the rotary members in the connecting body 30. In contrast, in a case where there is at least one rotary member that is not in linkage in the connecting body 30, probably, only rotary members in a folded region of the connecting body 30 rotate, rotary members in the other regions of the connecting body 30 do not rotate in linkage, thus implementing the mode switching process shown in FIGS. 8A to 8C.

Figure 10A:
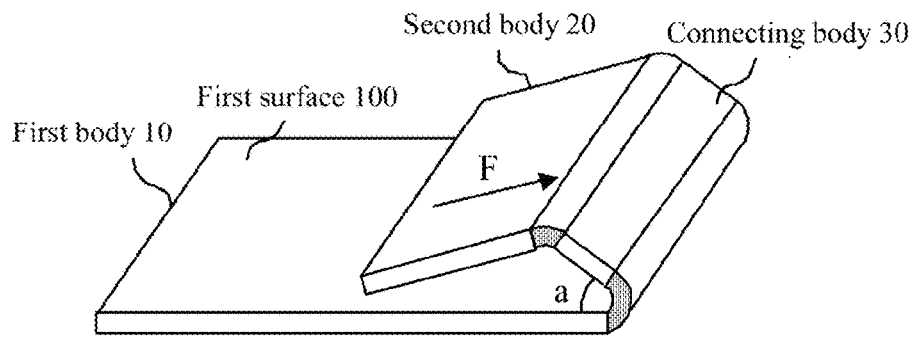
FIGS. 10A to 10C are schematic diagrams illustrating a switching process between the first mode and the second mode of the electronic device according to a second embodiment of the present disclosure.
Figure 10B:
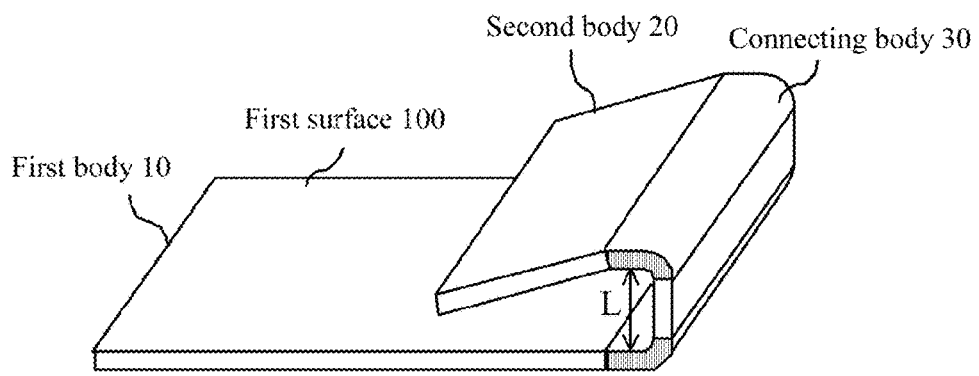
Figure 10C:
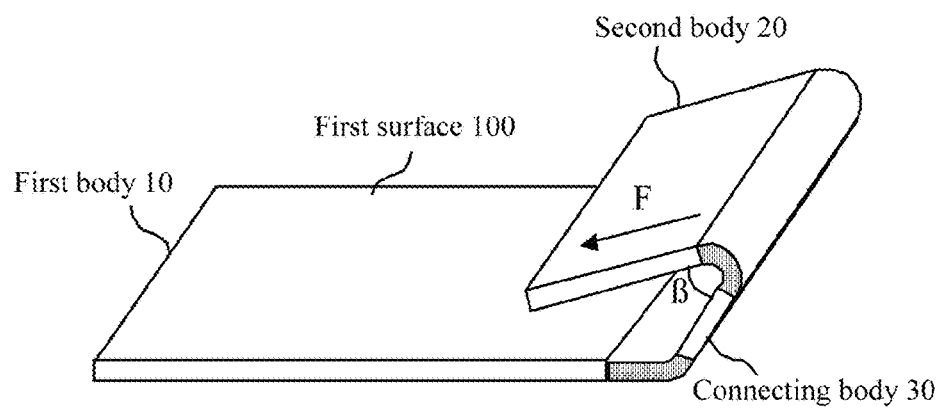

FIGS. 10A to 10C are schematic diagrams illustrating a switching process between the first mode and the second mode of the electronic device according to a second embodiment of the present disclosure. FIG. 10A illustrates the first mode of the electronic device according to the second embodiment of the present disclosure, FIG. 10C illustrates the second mode of the electronic device according to the second embodiment of the present disclosure, and FIG. 10B illustrates an arbitrary mode during a switching process between the first mode and the second mode according to the second embodiment of the present disclosure.

Similar to the electronic device according to the first embodiment of the present disclosure shown in FIGS. 8A to 8C, as shown in FIG. 10A, in the first mode, a first surface 100 of the first body 10 is covered by the connecting body 30 and the second body 20. As shown in FIG. 10C, in the second mode, a surface composed by the first surface 100 of the first body 10 and a first surface 300 of the connecting body 30 is covered by the second body 20.

Likewise, similar to the electronic device according to the first embodiment of the present disclosure shown in FIGS. 8A to 8C, the arbitrary mode in a switching process between the first mode and the second mode may be is a mode that can maintain stable without an external force, or a mode that requires an external force to maintain stable.

It should be noted that, the electronic device according to the second embodiment of the present disclosure as shown in FIGS. 10A to 10C differs from the electronic device according to the first embodiment of the present disclosure as shown in FIGS. 8A to 8C in: since configuration of the connecting body 30 is different than that of the connecting body of the electronic device according to the first embodiment described with reference to FIG. 9, so in the process of switching from the first mode shown in FIG. 10A to the second mode shown in FIG. 10C, the first body 10 and the second body 20, on the whole, do not slide in parallel in an approximate fitting, instead, only the sixth end 22 of the second body 20 slides in an approximate fitting with the first body 10. That is to say, always there is a first angle α between the first surface 100 of the first body 10 and the first surface 200 of the second body 20, and always there is a second angle β between the second body 20 and the connecting body 30.

Although in the second embodiment of the present disclosure, the first body 10 and the second body 20, on the whole, do not slide in parallel in an approximate fitting, as shown in FIGS. 10A to 10C, in the first mode and the second mode, a maximum distance between corresponding points of the first body 10 and the second body 20 is also less than a first predetermined threshold. As will be appreciated, the first predetermined threshold in the second embodiment of the present disclosure will be larger than the first predetermined threshold in the first embodiment thereof, for example, the first predetermined threshold in the second embodiment of the present disclosure is 1 cm, its specific length mainly depends on the non-rotary member 60 in the connecting body 30. Likewise, in a process that the electronic device switches from the first mode to the second mode through the arbitrary mode, a distance between the sixth end 22 of the second body 20 and the first surface 100 is maintained as smaller than the first predetermined threshold.

In addition, in the mode switching process shown in FIGS. 10A to 10C, an external force needs to be applied on the electronic device. In the first mode shown in FIG. 10A, when an external force F that has a component in a direction from the sixth end 22 to the fifth end 21 is applied on the second body 20, and a magnitude of the component of the external force satisfies a first predetermined condition, the electronic device switches from the first mode to the second mode. Likewise, in the second mode shown in FIG. 10C, when an external force F that has a component in a direction from the fifth end 21 to the sixth end 22 is applied on the second body 20, and a magnitude of the component of the external force satisfies a first predetermined condition, the electronic device switches from the second mode to the first mode. As already described above with reference to FIGS. 8A to 8C and 9, the first predetermined condition may be larger than the second predetermined condition.

Figure 11:
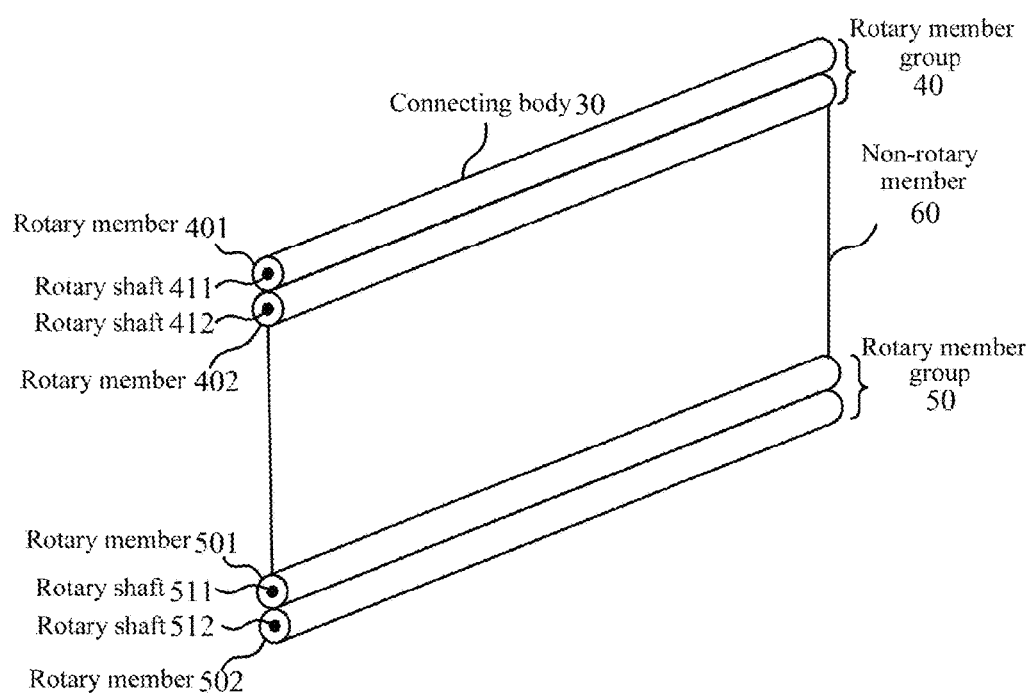
FIG. 11 is a schematic diagram further illustrating the connecting body according to the second embodiment of the present disclosure.

FIG. 11 is a schematic diagram further illustrating the connecting body according to the second embodiment of the present disclosure. As shown in FIG. 11, the connecting body 30 according to the second embodiment of the present disclosure comprises two rotary member groups 40 and 50 and at least one non-rotary member 60 between the two rotary member groups, each rotary member group 40 and 50 comprises at least two rotary members 401, 402, 501, 502. As described above, each of the at least two rotary members 401 and 402 (or 501 and 502) has a self-rotary shaft 411 and 412 (or 511 and 512), and respective self-rotary shafts 411 and 412 (or 511 and 512) of the at least two rotary members 401 and 402 (or 501 and 502) are parallel to each other. Likewise, for example, when an external force applied on one rotary member 401 is vertical to the self-rotary shaft 411 thereof and a magnitude of a component in a direction tangential to an outer surface of the one rotary member 401 satisfies a second predetermined condition, the one rotary member 401 can rotate around the self-rotary shaft 411 thereof. In addition, when there is no external force that satisfies the second predetermined condition on each of the rotary members of the two rotary member groups 40 and 50, the respective rotary members of the two rotary member groups 40 and 50 probably maintain a mutual stability due to the damping, so as to ensure the relative stable state between the first body 10, the second body 20, and the connecting body 30 of the electronic device 1.

Likewise, in an example of the second embodiment of the present disclosure, when one rotary member (e.g., rotary member 401 or 501) rotates, the other rotary members (rotary member 402 or 502) rotate accordingly. In addition, in another example of the second embodiment of the present disclosure, when the one rotary member (e.g., rotary member 401) rotates, the other rotary member 502 does not rotate. Different than that the connecting body 30 is totally composed by rotary members in the above first embodiment, since there is the non-rotary section 60 in the connecting body 30 of the second embodiment of the present disclosure, no matter the rotary members therein all rotate in linkage or there is a rotary member that does not rotate in linkage, the first body 10 and the second body 20, on the whole, do not maintain sliding in parallel in the whole mode switching process.

Figure 12A:
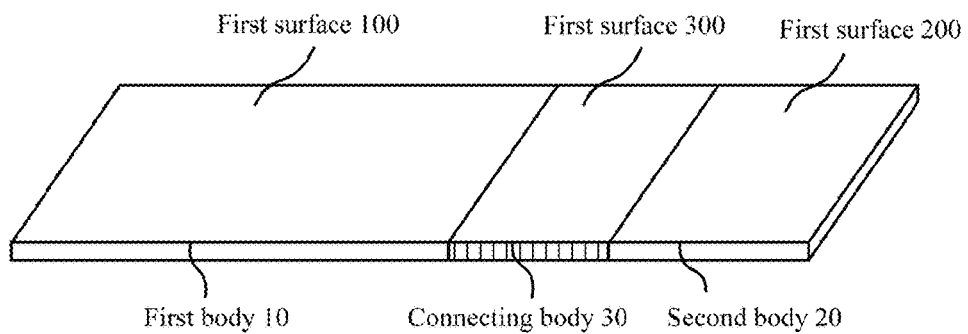
FIGS. 12A and 12B are schematic diagrams illustrating a third mode of the electronic device according to the first and second embodiments of the present disclosure.
Figure 12B:
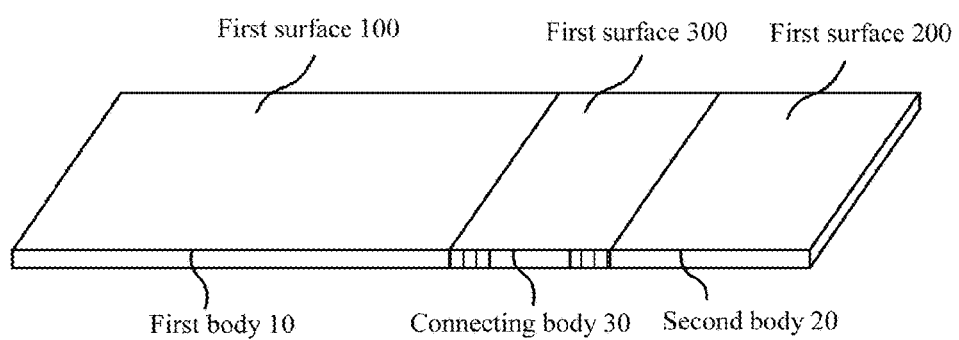

FIGS. 12A and 12B are schematic diagrams illustrating a third mode of the electronic device according to the first and second embodiments of the present disclosure. FIG. 12A illustrates a case of the first embodiment where the connecting body 30 is composed by the at least three rotary members 301-30n, FIG. 12B illustrates a case of the second embodiment where the connecting body 30 comprises two rotary member groups 40 and 50 and at least one rotary member 60 between the two rotary member groups. As shown in FIGS. 12A and 12B, the electronic device further has a third mode, in which a first outer surface composed by the first surface 100 of the first body 10, the first surface 300 of the connecting body 30, and the first surface 200 of the second body 20 is flat or approximately flat. Thickness of the first body 10, thickness of the second body 20, and thickness of the connecting body 30 are strictly the same, and when the first body 10 and the connecting body 30, and the second body 20 and the connecting body 30 fully rotate relative to each other to reach that an angle therein between is 180 degrees, the first external surface is flat. When thickness of the first body 10, thickness of the second body 20, and thickness of the connecting body 30 are different, or the first body 10 and the connecting body 30, and the second body 20 and the connecting body 30 do not fully rotate relative to each other, and an angle therein between is less than 180 degrees (e.g., 175 to 180 degrees), the first external surface is approximately flat.

Figure 13A:
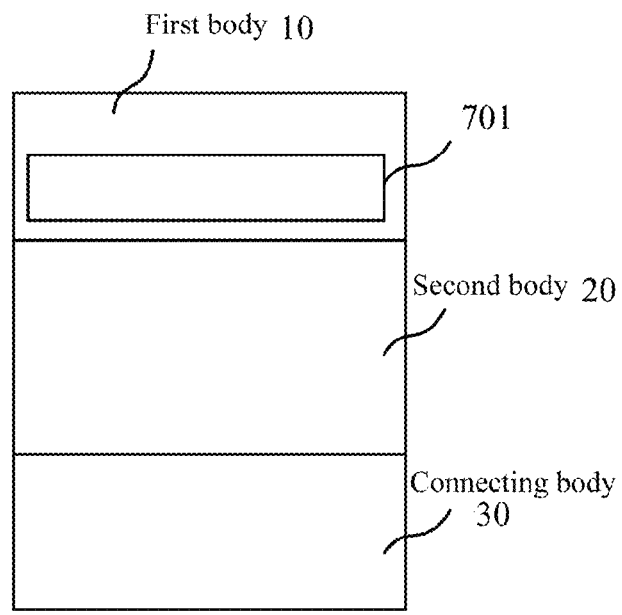
FIGS. 13A and 13B are schematic diagrams further illustrating the electronic device provided with a display according to the present disclosure.
Figure 13B:
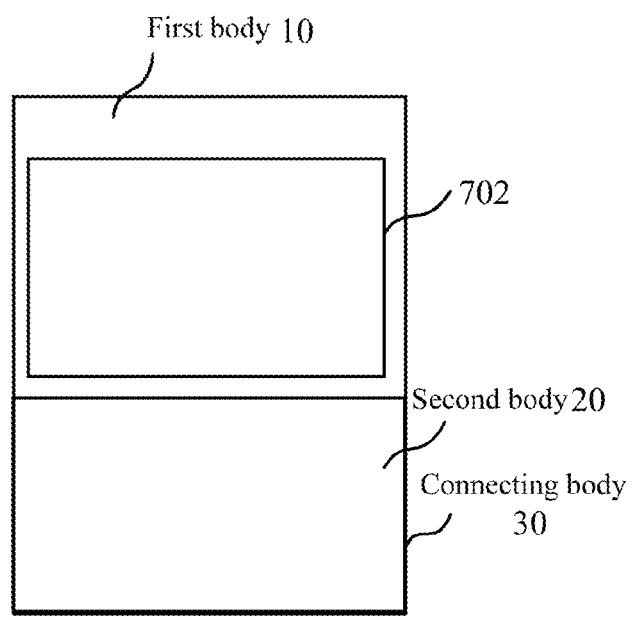

FIGS. 13A and 13B are schematic diagrams further illustrating the electronic device provided with a display. As shown in FIGS. 13A and 13B, the electronic device according to the first and second embodiments of the present disclosure further comprises a display 70 disposed at least on the first surface 100 of the first body 10. Further, as shown in FIGS. 13A and 13B, area of a first non-covered part 701 of the display 70 in the first mode is different than area of a second non-covered part 702 of the display 70 in the second mode.

Furthermore, as shown in FIGS. 13A and 13B, the display 70 is a deformable display, the display 70 is disposed at least in a region formed by the first surface 100 of the first body 10 and the first surface 200 of the second body 20; or the display 70 is disposed in a region formed by the first surface 100 of the first body 10, the first surface 300 of the connecting body 30, and the first surface 200 of the second body 20. In the first mode and the second mode described with reference to FIGS. 8A to 8C and 10A to 10C, one part of the display covers another part of the display 70.

Figure 14A:
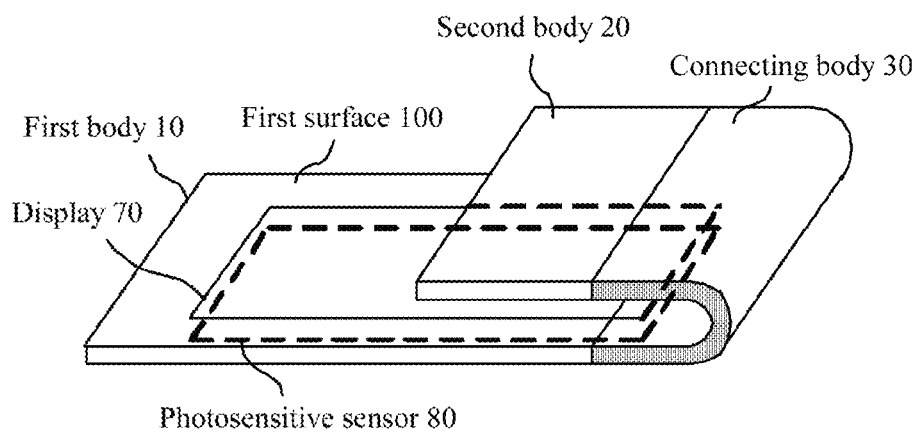
FIGS. 14A and 14B are schematic diagrams further illustrating the electronic device provided with a sensor according to the present disclosure.
Figure 14B:
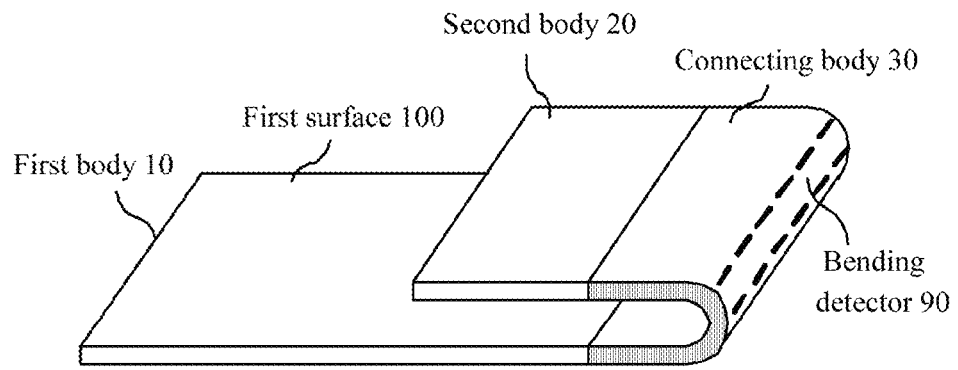

FIGS. 14A and 14B are schematic diagrams further illustrating the electronic device provided with a sensor. As described above with reference to FIGS. 7 to 13B, the electronic device according to the embodiments of the present disclosure have multiple different operating modes (such as the first mode, the second mode, and the third mode), and as shown in FIGS. 13A and 13B, in different operating modes, the display 70 disposed on the electronic device will be covered differently, thus there are different exposed regions. Therefore, multiple different operating modes of the electronic device may correspond to different operating modes, and different display content may be provided to the display 70 according to different operating modes.

Therefore, the electronic device may further comprise a sensor (not shown) disposed in the first body 10 and/or the connecting body 30 and/or the second body 20, and configured to detect a mode of the electronic device; and a processor (not shown) disposed in the first body 10 and/or the connecting body 30 and/or the second body 20, and configured to control a mode switching of the electronic device according to a mode detected by the sensor.

In an embodiment of the present disclosure, as shown in FIG. 14A, the sensor comprises a photosensitive component 80, the photosensitive component 80 comprises a light detecting array disposed corresponding to a light emitting array of the display 70, and is configured to determine an exposed region of the display according to a region that satisfies a predetermined luminance threshold in the light detecting array, so as to determine a mode of the electronic device. This is because in different modes of the electronic device, the display is differently covered by the connecting body 30 and/or the second body 20, and thereby has a different exposed region. Only the part disposed under the outer region of the light detecting array will sense entry of light that satisfies the predetermined luminance threshold, and the light sensed by the other covered part of the light detecting array does not satisfy the predetermined luminance threshold. Therefore, the part that detects the light that satisfies the predetermined luminance threshold of the light detecting array corresponds to an exposed region of the display 70 in a current mode.

In another embodiment of the present disclosure, as shown in FIG. 14B, the sensor comprises a sub bending detector 90 disposed in the connecting body 30 and configured to determine a mode of the electronic device according to a state of the connecting body 30. For example, the sub bending detector 90 may be an angle sensor that senses a current bending angle of the connecting body 30. By setting specific dimensions of the first body 10, the connecting body 30, and the second body 20 in advance, after the current bending angle of the connecting body 30 is sensed, it is possible to thereby determine a current mode of the electronic device.

In addition, in an embodiment of the present disclosure, the processor switches display content on the display according to a mode switching of the electronic device, and thereby adaptively provides the user with a display that best suits a current mode of the electronic device.

Figure 15:
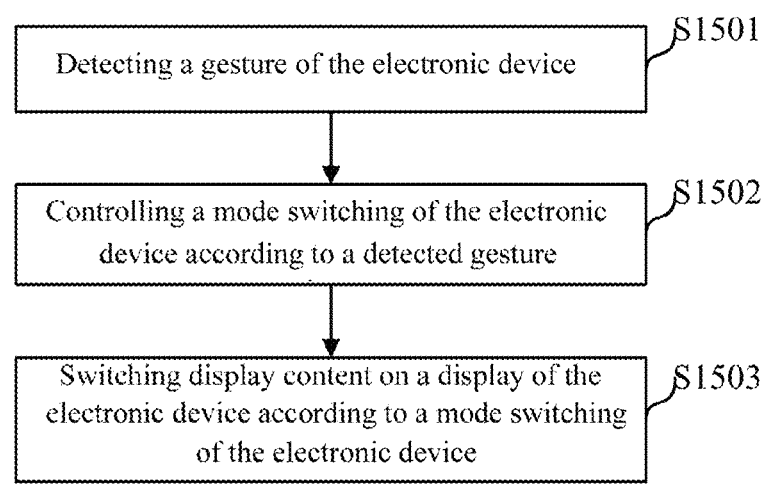
FIG. 15 is a flowchart illustrating a mode switching method according to an embodiment of the present disclosure.

FIG. 15 is a first flowchart illustrating a mode switching method according to an embodiment of the present disclosure. As shown in FIG. 15, a first example of the mode switching method according to an embodiment of the present disclosure comprises steps provided below.

In step S1501, a mode of the electronic device is detected. As described above, the electronic device has at least a first mode, in which a first surface of the first body is covered by the connecting body and the second body, and a second mode, in which a surface composed by the first surface of the first body and a first surface of the connecting body is covered by the second body. The mode of the electronic device may be detected by a sensor disposed in the first body and/or the connecting body and/or the second body. Thereafter, the process proceeds to step S1502.

In step S1502, a mode switching of the electronic device is controlled according to a detected mode. Thereafter, the process proceeds to step S1503.

In step S1503, display content on a display of the electronic device is switched according to a mode switching of the electronic device.

The embodiment of the present disclosure has been described above. According to the electronic device and the mode switching method thereof, at least two operation modes can be achieved, so that different display regions are provided in different operation modes, and corresponding content is displayed in different display regions according to the operation mode.

Figure 16:
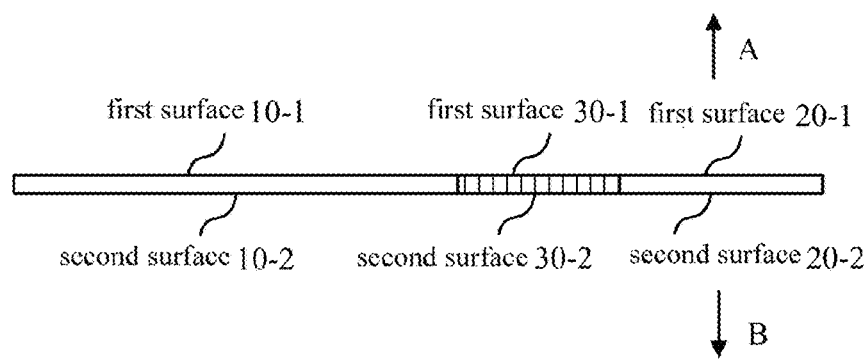
FIG. 16 is a side view of the structure of the electronic device according to an embodiment of the present disclosure.

FIG. 16 is a side view of a structure of an electronic device according to the present disclosure. As shown in FIG. 16, the first body 10, the second body 20 and the connecting body 30 have the first surface and the second surface opposite to each other, respectively. Specially, the first body 10 has the first surface 10-1 and the second surface 10-2, the second body 20 has the first surface 20-1 and 20-2; the connecting body has the first surface 30-1 and the second surface 30-2. Thereby, the first surface 10-1 of the first body 10, the first surface 20-1 of the second body 20 and the first surface 30-1 of the connecting body 30 constitute the first outer surface (the front surface) of the electronic device 1; the second surface 10-2 of the first body 10, the second surface 20-2 of the second body 20 and the second surface 30-2 of the connecting body 30 constitute the second outer surface (the back surface) of the electronic device 1. It should be noted that in the present disclosure, since the shape of the connecting body 30 is variable, the second body 20 can move relative to the first body 10 based on the connecting body 30, for example, in the direction of A or B shown in FIG. 16, so that the electronic device 1 can be switched between various modes.

Figure 17:
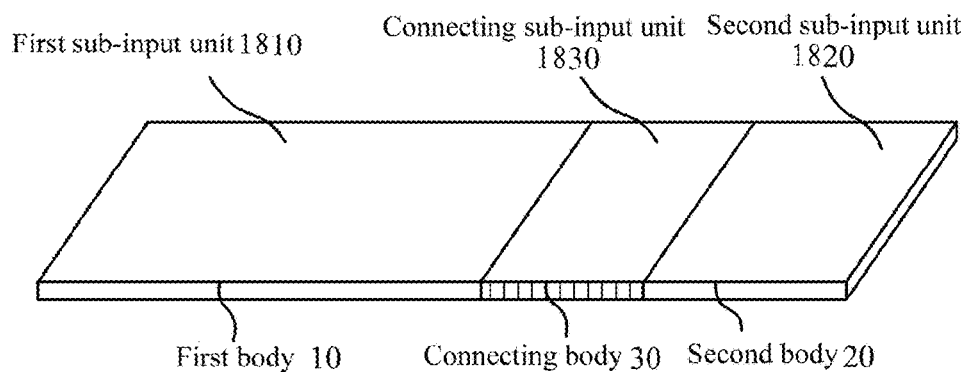
FIG. 17 is a perspective view of sub-input units of respective sections of the electronic device according to an embodiment of the present disclosure.

Hereinafter, respective input units of the electronic device according to the embodiment of the present disclosure will be described in detail with reference to the accompanying drawings. FIG. 17 is a perspective view of sub-input units of respective sections of the electronic device according to the embodiment of the present disclosure. As shown in FIG. 17, the connecting body 30 comprises a connecting sub-input unit 1830 configured to acquire a user input operation. For example, the second body 20 and the first body 10 may also have a first sub-input unit 1810 and a second sub-input unit 1820, respectively. In this way, the processor (not shown) of the electronic device 1 may perform a corresponding processing according to an input operation acquired by the respective sub-input units. For example, these sub-input units are a touch sensor, but they may be also a physical key or any other form of input units, as long as they can acquire the user's input operation. Typically, the first sub-input unit 1810, the second sub-input unit 1820, and the connecting sub-input unit 1830 may be disposed on the same outer surface of the electronic device 1. FIG. 17 shows an example that the respective sub-input units are disposed on the first outer surface of the electronic device, that is, the first sub-input unit 1810 is disposed on the first surface 10-1 of the first body 10, the second sub-input unit 1820 is disposed on the first surface 20-1 of the second body 20, and the connecting sub-input unit 230 is disposed on the first surface 30-1 of the connecting body 30. However, the present disclosure is not limited to the case described above, at least one sub-input unit may be also disposed on the second surfaces of corresponding sections, for example, the connecting sub-input unit 1830 is disposed on the second surface of the connecting body 30. In addition, at least one sub-input unit may be also disposed on the first and second surfaces of corresponding sections, for example, the second sub-input unit 1820 is disposed on the first surface 20-1 and the second surface 20-2 of the second body 20.

Figure 18:
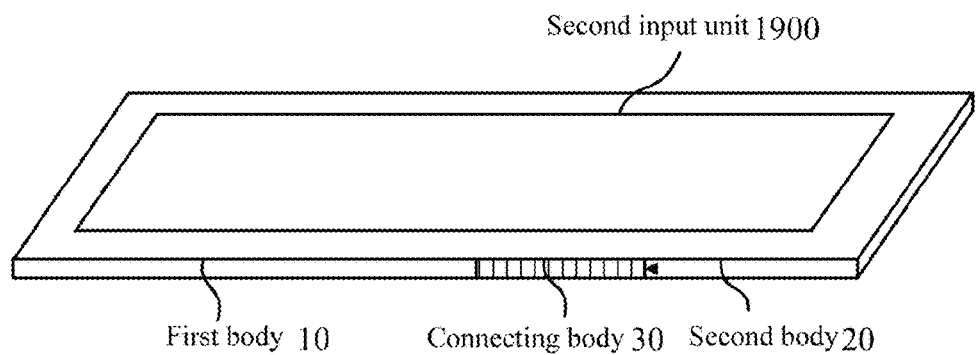
FIG. 18 is a perspective view of a second input unit of the electronic device according to the embodiment of the present disclosure.

Next, the embodiments of the electronic device will be described in detail with reference to the accompanying drawings. FIG. 18 is a perspective view of a second input unit of the electronic device according to the embodiment of the present disclosure. As shown in FIG. 18, the electronic device 1 may also have a second input unit 1900 on the first outer surface, for acquiring an input operation on the whole first outer surface. In this case, the first sub-input unit 1810, the connecting sub-input unit 1830, and the second input unit 1820 compose the first region, the second region, and the third region on the second input unit, respectively. By the above-described structure, it is possible to acquire an input from a user integrally on the first outer surface, so that the user can input instructions in a larger space, achieve stronger functions.

Figure 19:
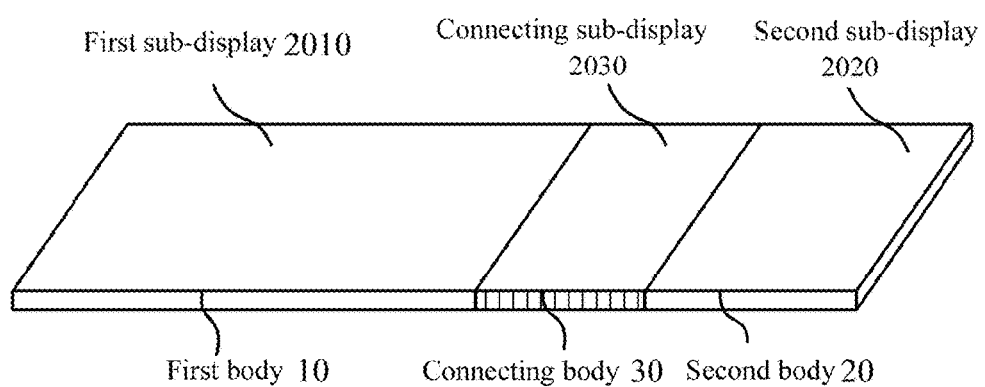
FIG. 19 is a perspective view of sub-displays of respective sections of the electronic device according to the embodiment of the present disclosure.

In addition to the function of acquiring user input, the electronic device 1 according to this embodiment of the present disclosure may also simultaneously have a display function. FIG. 19 is a perspective view of sub-displays of respective sections of the electronic device according to the embodiment of the present disclosure. As shown in FIG. 19, the first surface 10-1 of the first body 10 may comprise the first sub-display 2010, the first surface 30-1 of the connecting body 30 may comprise the connecting sub-display 2030, the first surface 20-1 of the second body 20 may comprise the second sub-display 2020. In this way, respective sub-displays can display contents associated with processes executed by the processor of the electronic device 1. However, the present disclosure is not limited to the case described above, at least one sub-display may be also disposed on the second surfaces of corresponding sections, for example, the sub-display 2030 is disposed on the second surface 30-1 of the connecting body 30. In addition, at least one sub-input unit may be also disposed on the first and second surfaces of corresponding sections, for example, the second sub-display 2020 is disposed on the first surface 20-1 and the second surface 20-2 of the second body, respectively. On the other hand, the electronic device 1 according to the embodiment of the present disclosure may also comprise one or two among the first sub-display, the connecting sub-display, and the second sub-display. For example, the electronic device 1 according to the embodiment of the present disclosure may have no second sub-display disposed on the first surface of the second body.

In an embodiment, the first sub-display 2010, the second sub-display 2020, and the connecting sub-display 2030 may be made overlap with at least a part of the first sub-input unit 1810, the second sub-input unit 1820, and the connecting input unit 1830, respectively, to achieve a touch screen function of the first body 10, the second body 20 and the connecting body 30.

Figure 20:
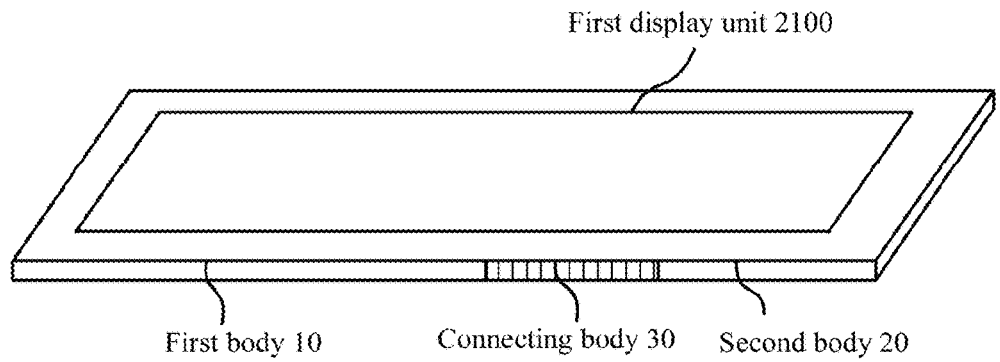
FIG. 20 is a perspective view of a first display of the electronic device according to the embodiment of the present disclosure.

For example, it is possible to set a deformable display 2100 on the first outer surface of the electronic device. FIG. 20 is a perspective view of a first display of the electronic device according to the embodiment of the present disclosure. As shown FIG. 20, the first sub-display 2010, the connecting sub-display 2030, and the second sub-display 2020 form the first region, the second region, and the third region of the first display 2100, respectively. It should be noted that, the present disclosure is not limited thereto, the first display 2100 may cover only one or two among the respective sub-displays, for example, the first sub-display 2010 and the connecting sub-display 2030 serve as the first region and the second region of the first display 2100, and the second sub-display 2020 is independent of the first display 2100. In this case, the first display 2100 may have a deformation along with the connecting body 30, thereby it can adapt to various modes of the electronic device 1. By means of disposing the first display 2100 on the first outer surface, associated content can be displayed in a large area in the first outer surface of the electronic device 1, such as playing a video etc. In addition, the first display 2100 may overlap with at least a part of the second input unit 1900, this can achieve the touch screen function entirely on the first outer surface of the electronic device 1.

The electronic device 1 may store in a storage (not shown) various instruction sets, and instructions in each instruction set indicate a mapping relationship between a user input and a corresponding processing executed by the processor (not shown). In an embodiment of the present disclosure, the processor can respond to an input operation acquired respectively by the first sub-input unit 1810, the second sub-input unit 1820, and the connecting sub-input unit 1830 (or acquired by the second input unit 1900 entirely), according to a different mode of the electronic device 1 and depending on instructions in a different instruction set. Illustration will be provided below with the third mode and the fourth mode as example.

Figure 21:
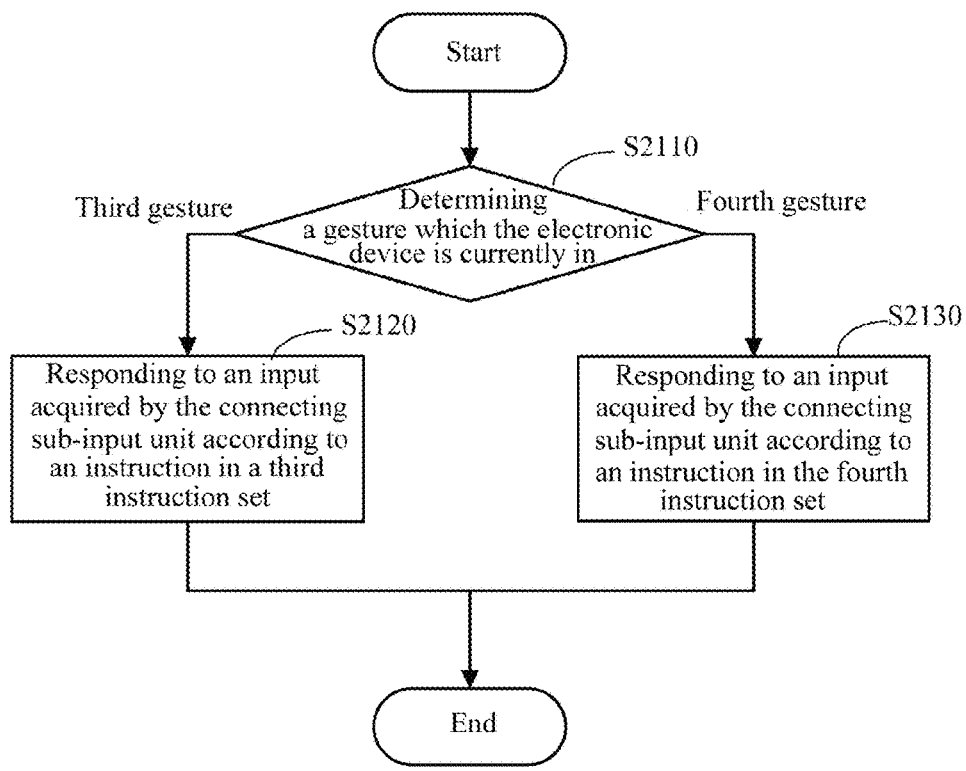
FIG. 21 is a flowchart of a control method of the electronic device according to an embodiment of the present disclosure.

Hereinafter, actions of the processor of the electronic device 1 will be described in detail with reference to the accompanying drawings, these steps will constitute a control method for the electronic device in the present disclosure. It should be noted that, illustration will be provided below with the third mode and the fourth mode of the electronic device 1 as example, but in fact, it is not limited thereto, the present disclosure may be applied to other modes of the electronic device 1. FIG. 21 is a flowchart of a control method of the electronic device according to the embodiment of the present disclosure, as shown in FIG. 21:

First, a mode which the electronic device 1 is currently in is determined (step S2110). As described above, since the connecting body 30 is deformable, so the second body 20 is at least capable of rotating relative to the first body based on the connecting body, thus the electronic device 1 can switch between different modes. Accordingly, it is possible to set a sensor on the connecting body 30 of the electronic device 1, and a mode which the electronic device 1 is currently in may be determined according to a deformation state of the connecting body 30.

Figure 22:
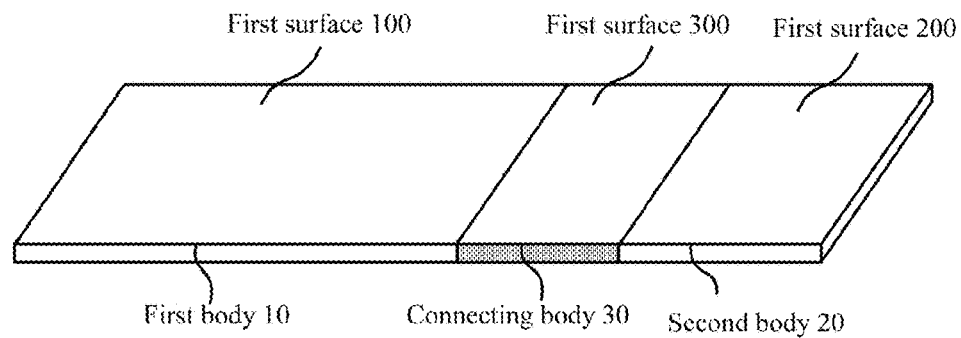
FIG. 22 is a perspective diagram of the third mode of the electronic device according to an embodiment of the present disclosure.

When the electronic device is in the third mode, an input acquired by the connecting sub-input unit is responded according to an instruction in a third instruction set (step S2120). FIG. 22 is a perspective view of the third mode of the electronic device according to the present disclosure. As shown in FIG. 22, when the electronic device 1 is in the third mode, the first surface 10-1 of the first body 10, the first surface 30-1 of the connecting body 30 and the first surface 20-1 of the second body 20 almost form the same plane. In this case, the electronic device 1 presents the user with an entire first outer surface, thus the third instruction set can make the connecting sub-input unit, the first sub-input unit, and the second sub-input unit as an input in common (or making the second input unit as an input) to perform corresponding processing. In this way, an input from the user can be acquired on the entire first outer surface, thus achieving various functions that require a wide range.

Figure 23:
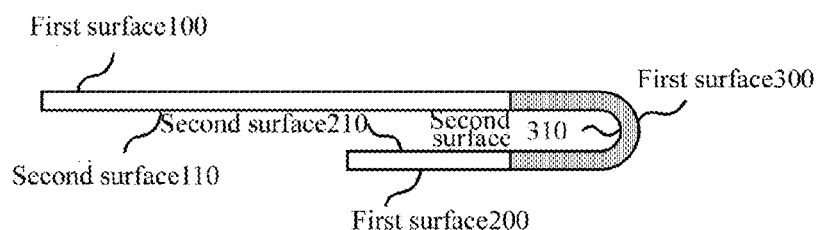
FIG. 23 is a perspective diagram of the fourth mode of the electronic device according to an embodiment of the present disclosure.
Figure 24:
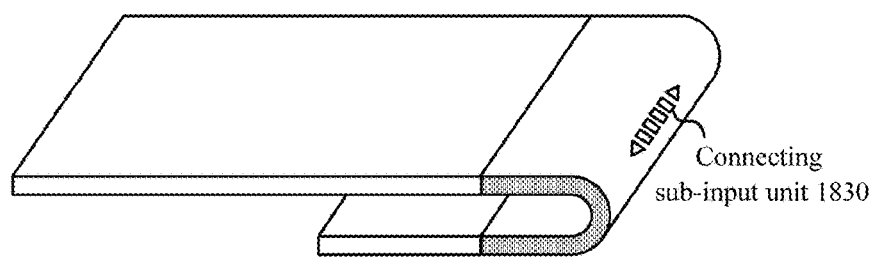
FIG. 24 is a perspective view of a connecting sub-input unit of the electronic device according to an embodiment of the present disclosure.

When the electronic device is in the fourth mode, an input acquired by the connecting sub-input unit is responded according to an instruction in the fourth instruction set (step S2130). FIG. 23 is a perspective view of the fourth mode of the electronic device according to the present disclosure. As shown in FIG. 23, in the fourth mode, the second surface 10-2 of the first body 10 is opposite to the second surface 20-2 of the second body 20. The fourth mode may be a state in which the second surface 20-2 of the second body 20 is in contact with the second surface 10-2 of the first body 10, or may be a state in which the distance between the second surface 20-2 of the second body 20 and the second surface 10-2 of the first body 10 is smaller than a predetermined threshold. The fourth instruction set may be instructions that make the connecting sub-input unit 1830 to acquire independently from the first sub-input unit 1810 and the second sub-input unit 1820. As an example, display of the first sub-display 2010 and/or the second sub-display 329 may be controlled in response to an input acquired by the connecting sub-input unit 1830. For example, during a video playback function of the electronic device 1, it is possible to slide the connecting sub-input unit 1830 to adjust the volume; during an image display function, it is possible to slide the connecting sub-input unit 1830 to zoom in or zoom out a picture; during an electronic book reading function, it is possible to slide the connecting sub-input unit 1830 to control page turning, etc. FIG. 24 is a perspective view of a connecting sub-input unit of the electronic device according to the embodiment of the present disclosure. As shown in FIG. 24, when the electronic device 1 is in the fourth mode, the connecting part is bent so that a first surface facing the user will form a thin strip region along the direction of rotary shaft. In this case, the connecting input unit 1830 for example comprises a touch sensor, and the processor of the electronic device determines an input of the touch sensor, when a determination result indicates that the input is a slide input along the direction of the rotary shaft, various processes described above are to be executed. In this way, it is possible to identify a slide input along the direction of the rotary shaft, thus avoiding an error operation.

Through the above processes, in the electronic device that comprises a first body, a connecting body, and a second body capable of rotating relative to the first body based on the connecting body, and can switch between various modes, an input operation is acquired through a connecting sub-input unit disposed in the connecting body, the electronic device can use space efficiently in various modes and flexibly control the electronic devices.

In a further implementation, in the electronic device shown in FIG. 7, based on the connecting body 30, the electronic device 1 has at least three modes, wherein, the first body 10 and the second body 20 have a first relative location relationship in the first mode, the first body 10 and the second body 20 have a second relative location relationship in the second mode, and the first body 10 and the second body 20 have a third relative location relationship in the third mode. Here, the first relative location relationship, the second relative location relationship and the third relative location relationship are different from each other.

The electronic device 1 may be switched from the second mode to the first mode in a first way, and may be switched from the third mode to the first mode in a second way different from the first way.

Figure 25A:
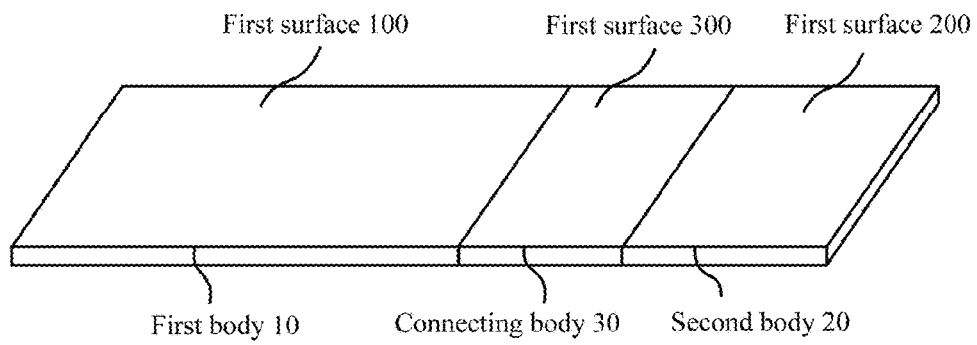
FIGS. 25A to 25C are schematic diagrams illustrating a switching process between the first mode and the third mode according to an embodiment of the present disclosure.
Figure 25B:
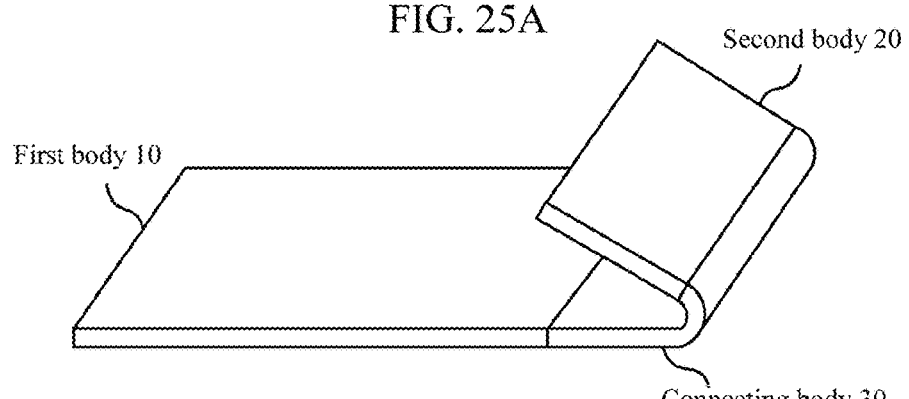
Figure 25C:
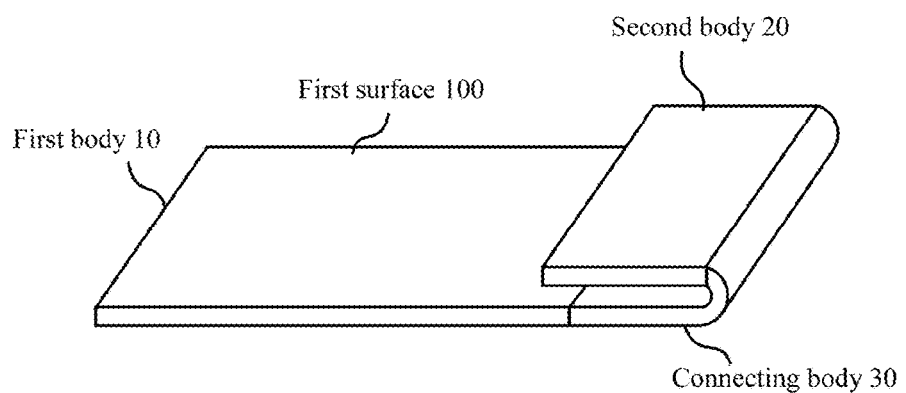

As described above, FIGS. 8A to 8C are schematic diagrams illustrating a switching process between a first mode and a second mode of the electronic device according to a first embodiment of the present disclosure, and FIGS. 10A to 10C are schematic diagrams illustrating a switching process between the first mode and the second mode of the electronic device according to a second embodiment of the present disclosure. It can be seen that, although in the first embodiment and the second embodiment, configuration of the connecting body 30 is different, the switching manner between the first mode and the second mode are the same. In addition, FIGS. 25A to 25C are schematic diagrams illustrating a switching process between the first mode and the third mode according to the first and second embodiments of the present disclosure. In FIGS. 25A to 25C, specific configuration of the connecting body 30 is not shown in particular, in other words, in FIGS. 25A to 25C, the connecting body 30 may adopt either the configuration in the first embodiment or the configuration in the second embodiment. FIG. 25A illustrates the third mode of the electronic device of the present disclosure, FIG. 25C illustrates the first mode of the electronic device of the present disclosure, and FIG. 25B illustrates an arbitrary mode during the process of switching between the third mode and the first mode. From a comparison among FIGS. 8A to 8C, 10A to 10C, and 25A to 25C, it can be clearly seen that, the difference between the first manner and the second manner comprises: movement mode of the second body in the first manner and the second manner is different.

Hereinafter, different movement modes of the second body 20 in the first manner and the second manner will be explained from different angles.

First, it is possible to consider from the angle of different ways of force acting.

The electronic device 1 may be made to switch between the second mode and the first mode with a first manner. In the second mode, with the first manner, an external force that has a component in the direction from the fifth end 21 to the sixth end 22 is applied on the second body 20, and a magnitude of the external force satisfies the second predetermined condition, that is, the external force is enough to make the second body 20 slide relative to the first body 10 through the connecting body 30, so that the electronic device switches from the second mode to the first mode. That is to say, in this case, with the first manner, the second body is acted upon by a push parallel to the first surface of the electronic device 1 and pointing from the fifth end 21 to the sixth end 22, in other words, the second body 20 is acted upon by a push for sliding in a direction of being close to the first body 10, so that the electronic device 1 switches from the second mode to the first mode. Of course, on the other hand, in the first mode, with the first manner, an external force that has a component in the direction from the sixth end 22 to the fifth end 21 is applied on the second body 20, and a magnitude of the external force satisfies the second predetermined condition, that is, the external force is enough to make the connecting body 30 move, so that the electronic device switches from the first mode to the second mode. That is to say, in this case, with the first manner, the second body is acted upon by a push parallel to the first surface of the electronic device 1 and pointing from the sixth end 22 to the fifth end 21, in other words, the second body 20 is acted upon by a push for sliding in a direction of being away from the first body 10, so that the electronic device 1 switches from the first mode to the second mode.

The electronic device 1 may be made to switch between the third mode and the first mode with the second manner. In the third mode, with the second manner, an external force that has a component in the rotary direction from the sixth end 22 to be close to the first surface of the first body is applied on the second body 20, and a magnitude of the external force satisfies a third predetermined condition, that is, the external force is enough to make the second body 20 rotate relative to the first body 10 through the connecting body 30, so that the electronic device switches from the third mode to the first mode. That is to say, in this case, with the second manner, the second body is acted upon by a push having a certain angle (for example, the angle is 90 degrees) with the first surface of the second body 20 and pointing from a rotary direction from the sixth end 22 to be close to the first surface of the first body 10, in other words, the second body 20 is acted upon by a push that rotates the second body 10 toward a direction of being close to the first surface of the first body 10, so that the electronic device 1 switches from the third mode to the first mode. Of course, on the other hand, in the third mode, with the second manner, an external force that has a component in the rotary direction from the sixth end 22 to be away from the first surface of the first body is applied on the second body 20, and a magnitude of the external force satisfies the third predetermined condition, that is, the external force is enough to make the second body 20 rotate relative to the first body 10 through the connecting body 30, so that the electronic device switches from the first mode to the third mode. That is to say, in this case, with the second manner, the second body 20 is acted upon by a push having a certain angle (for example, the angle is 90 degrees) with the first surface of the second body 20 and pointing from a rotary direction from the sixth end 22 to be away from the first surface of the first body 10, in other words, the second body 20 is acted upon by a push that rotates the second body 10 toward a direction of being away from the first surface of the first body 10, so that the electronic device 1 switches from the first mode to the third mode.

Second, it is possible to consider from the angle of different movement directions.

The electronic device 1 may be made to switch between the second mode and the first mode with the first manner. In the second mode, with the first manner, the second body 20 and the first body 10 move relatively in parallel (in substance, totally parallel or approximately parallel), wherein an angle between the first body 10 and the second body 20 maintains constant and less than the second predetermined threshold, so that the electronic device 1 switches from the second mode to the first mode. For example, in the first embodiment, the second body 20 and the first body 10 move relatively in total parallel, so that the angle between the first body 10 and the second body 20 maintains constant and is zero. However, in the second embodiment, in an allowable range, the second body 20 and the first body 10 move relatively in approximate parallel, in this case, the angle between the first body 10 and the second body 20 maintains constant and is a, of course, a is a value smaller than the second predetermined threshold. On the other hand, in the first mode, with the first manner, the second body 20 and the first body 10 move relatively toward opposite directions, so that the electronic device 1 switches from the first mode to the second mode.

The electronic device 1 may be made to switch between the third mode and the first mode with the second manner. In the third mode, with the second manner, the second body 20 and the first body 10 rotate relatively, wherein the angle between the first body 10 and the second body 20 reduces continuously, so that the electronic device switches from the third mode to the first mode. On the other hand, in the third mode, with the second manner, the second body 20 and the first body 10 rotate relatively in directions opposite to each other, wherein the angle between the first body 10 and the second body 20 increases continuously, so that the electronic device switches from the first mode to the third mode.

Thereafter, it is also possible to consider from the angle of different distances between the sixth end 22 and the first surface 100 of the first body 10 during a movement.

The electronic device 1 may be made to switch between the second mode and the first mode with the first manner. In the second mode, with the first manner, the second body 20 moves while maintaining the distance between the sixth end 22 and the first surface 100 of the first body 10 as smaller than the first predetermined threshold, so that the electronic device 1 switches from the second mode to the first mode. Of course, on the other hand, in the first mode, with the first manner, the second body 20 moves while maintaining the distance between the sixth end 22 and the first surface 100 of the first body 10 as smaller than the first predetermined threshold, so that the electronic device 1 switches from the first mode to the second mode. For example, the switching between the second mode and the first mode may be made with the first manner in a case where the section 20 and the first body 10 are in a complete fitting, in this case, the distance between the sixth end 22 and the first surface of the first body 10 is zero. Another example, it is also possible to make only the sixth end 22 of the second body 20 contact the first surface 100 of the first body 10 but the rest of the second body 20 does not contact, in this case, the distance between the sixth end 22 and the first surface of the first body 10 is a small value in an allowable range, that is, smaller than the first predetermined threshold.

The electronic device 1 may be made to switch between the third mode and the first mode with the second manner. In the third mode, with the second manner, the second body 20 moves while the distance between the sixth end 22 and the first surface of the first body 10 is made to increase from the second predetermined threshold to a maximum and then reduce to below the first predetermined threshold, so that the electronic device 1 switches from the third mode to the first mode. In the third mode, if, as described above, the first surface 100 of the first body 10, the second surface 200 of the second body 10, and the third surface 300 of the third section 30 are in one plane strictly, then when switching from the third mode to the first mode with the second manner, first, the distance between the sixth end 22 and the first surface of the first body 10 is zero, that is, the second predetermined threshold is zero. Then, along that the second body rotates toward a direction of being close to the first body 10, the distance between the two increases gradually to the maximum, for example, the maximum is reached when the second body 20 and the first body 10 are vertical, thereafter, the distance between the two decreases gradually to the first predetermined threshold, that is, the minimum is reached when the second body 20 and the first body 10 are totally or essentially fitting. In the third mode, if, as described above, the first surface 100 of the first body 10, the second surface 200 of the second body 10, and the third surface 300 of the third section 10 are in one plane strictly, then when switching from the third mode to the first mode with the second manner, initially, the distance between the sixth end 22 and the first surface of the first body 10 is a non-zero small value. On the other hand, in the first mode, with the second manner, the second body 20 moves while the distance between the sixth end 22 and the first surface of the first body 10 is made to increase from below the first predetermined threshold to a maximum and then reduce to the second predetermined threshold, so that the electronic device switches from the first mode to the third mode.

In the above, for convenience of understanding, differences between the first manner and the second manner for changing a mode are explained from three different angles. However, the present disclosure is not limited thereto. As will be appreciated by those skilled in the art, any other possible angles may also be used similarly to explain the differences between the first manner and the second manner.

In addition, in the electronic device shown in FIG. 14, the photosensitive component 80 may further determine whether a size of the part sensing the light that satisfies the predetermined luminance threshold of the light detecting array increases gradually or sharply. If the photosensitive component 80 determines a size of the part sensing the light that satisfies the predetermined luminance threshold of the light detecting array increases gradually, it should be determined that mode is switched with the first manner. On the other hand, if the photosensitive component determines size of the part sensing the light that satisfies the predetermined luminance threshold of the light detecting array increases sharply, it should be determined that mode is switched with the second manner.

In addition, in the electronic device shown in FIG. 14B, the sub bending detector 90 may further detect rotation of the rotary shafts comprised in the connecting body 30. As described above, the connecting body 30 may comprise multiple rotary shafts. For example, if the sub bending detector 90 detects that only some rotary shafts among the multiple rotary shafts rotate while the rest do not, and the rotary shafts that rotate change in sequence (e.g., 311, 312, 313 at a current moment, 312, 313, 314 in a next moment), then it should be determined that mode is switched with the first manner. On the other hand, if the sub bending detector 90 detects that all rotary shafts among the multiple rotary shafts rotate, it should be determined that mode is switched with the second manner.

Here, it is to be noted that the area of the first uncovered section of the display in the first mode is smaller than that of the second uncovered section of the display in the second mode.

Next, different examples of switching of display content during a mode switching will be described in detail.

As a first example, suppose that in the second mode, the display 70 displays a third content. When the sensor detects that the electronic device 1 switches from the second mode to the first mode with the first manner described above, the processor controls the display 70 to switch from displaying the third content to displaying a first content.

Because, as described above, area of a first non-covered part of the display in the first mode is smaller than area of a second non-covered part of the display in the second mode, thus, the first content that can be displayed in the first mode certainly is less than the second content that can be displayed in the second mode. Here, the first content is a part of the third content, and the first content is different than a first sub-content of the third content, the first sub-content is a content displayed in the second mode in the region where the first content resides. That is to say, although the first content is a part of the third content, it is not simply cutting the third content as it is, instead, it is a simplified re-combination of respective items in the third content. That is to say, when switching from the second mode to the first mode with the first manner, it is possible to switch the electronic device to a more simplified operating mode.

Figure 26A:
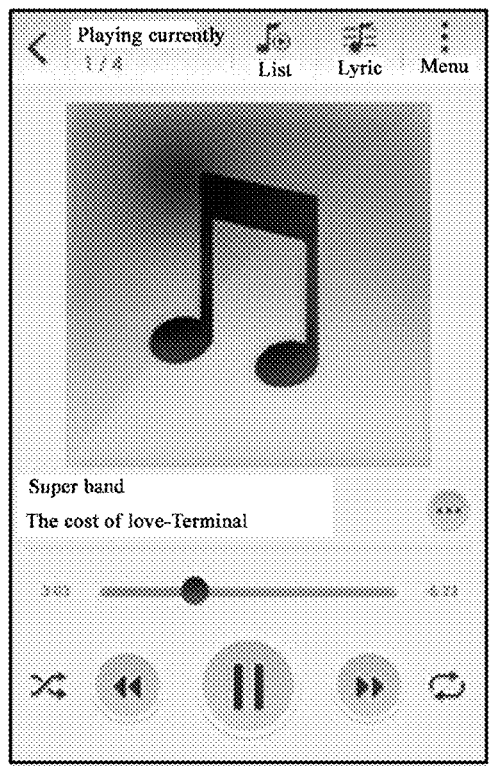
FIG. 26A illustrates an example of display content when an exposed region (the non-covered part) of the display is large.
Figure 26B:
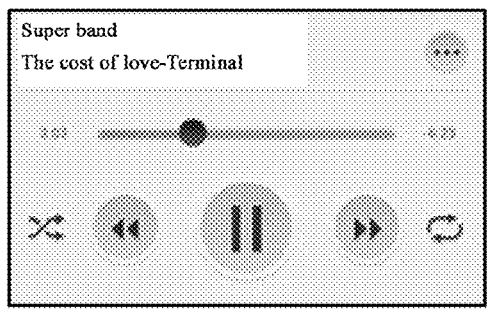
FIG. 26B illustrates an example of display content when an exposed region (the non-covered part) of the display is small.

For example, FIG. 26A shows an example of the display content when the exposed region (i.e., non-covered part) of the display 70 is large, whereas FIG. 26B shows another example of the display content when the exposed region (i.e., non-covered part) of the display 70 is small. As shown in FIGS. 26A and 26B, the third content may be a complete content that comprises playback control buttons (comprising play, pause, fast forward, etc.), a playback progress bar, lyrics, album covers, etc., and the first content may be a simplified content that comprises only the playback control buttons and the playback progress bar. Of course, in the first content, layout of the playback control buttons and the playback progress bar needs to be re-arranged.

It is usually recognized that, when the user changes from the second mode to the first mode with the first manner, there is a high possibility for the user to desire to further operate the electronic device, and since valid area that executes displaying of the display reduces, thus displaying is switched to the simplified content display to facilitate further operating of the user.

On the other hand, suppose in the first mode, the display 70 displays the first content. When the sensor detects that the electronic device 1 switches from the first mode to the second mode with the first manner described above, the processor controls the display 70 to switch from displaying the first content to displaying the third content.

As a second example, suppose in the third mode, the display 70 displays a fourth content, when the sensor detects that the electronic device 1 switches from the third mode to the first mode with the second manner described above, the processor controls the display 70 to switch from displaying the fourth content to displaying a second content.

Figure 26C:
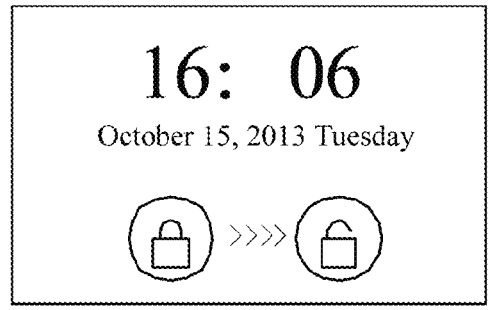
FIG. 26C illustrates another example of display content when an exposed region (the non-covered part) of the display is small according to the sixth implementation of the present disclosure.

Different than that the first content and the third content in the first example are relevant, in the second example, the second content is predetermined content, and the second content is irrelevant to the fourth content. Switching from the third mode to the first mode with the second manner can switch the electronic device to an operating mode requiring less power consumption and/or less operation procedures. For example, FIG. 26A shows an example of the display content when the exposed region (i.e., non-covered part) of the display 70 is large, whereas FIG. 26C shows another example of the display content when the exposed region (i.e., non-covered part) of the display 70 is small. As shown in FIGS. 26A and 26C, the fourth content may be also a complete content that comprises playback control buttons (comprising play, pause, fast forward, etc.), a playback progress bar, lyrics, album covers, etc., and the second content may be a screen lock interface.

It is usually recognized that, when the user changes the second mode to the third mode with the second manner, there is a high possibility for the user to desire to not operate the electronic device any more, thus the electronic device is directly switched to a screen lock mode and the display displays a screen lock interface so as to reduce power consumption effectively.

On the other hand, suppose in the first mode, the display 70 displays the second content. When the sensor detects that the electronic device 1 switches from the first mode to the third mode with the second manner described above, the processor controls the display 70 to switch from displaying the second content to displaying the fourth content.

In the above, situations of switching between the first mode and the second mode with the first manner and switching between the first mode and the third mode with the second manner are respectively illustrated with two independent examples. However, it is also possible to combine the first example and the second example, that is, in one example, the situations of switching between the first mode and the second mode with the first manner and switching between the first mode and the third mode with the second manner are both comprised.

As a third example, suppose in the second mode, the display 70 displays a fifth content. When the sensor detects that the electronic device 1 switches from the first mode to the second mode with the first manner described above, the processor controls the display 70 to switch from displaying the fifth content of the first disclosure to displaying a sixth content of the first application. And suppose in the third mode, the display 70 displays a seventh content of the first application. In the third example, what should be focused on is that display content will be different when switching to the first mode with different manners (the first manner or the second manner) in a case where the same application is displayed in the first mode and the third mode. Here, it should be noted that, since area of the second non-covered part of the display in the second mode is smaller than area of the third non-covered part of the display in the third mode, thus even if the same application is displayed in the second mode and third mode, content of the same application will be different slightly. Therefore, in the above, the two are differentiated with the fifth content of the first application and the seventh content of the first application. When the detector detects that the electronic device 1 switches from the third mode to the first mode with the second manner, the processor controls the display 70 to switch from displaying the seventh content of the first application to displaying an eighth content of a non-first application, wherein the eighth content of a non-first application is irrelevant to the seventh content of the first application. For example, the eighth content of a non-first application may be a screen lock interface.

In this way, when the user changes the second mode to the first mode with the first manner, there is a high possibility for the user to desire to further operate the electronic device, and when the user changes the third mode to the first mode with the second manner, there is a high possibility for the user to desire to not operate the electronic device any more, thus the processor configured to switch the display content from the fifth content of the first application to the sixth content thereof when switching the second mode to the first mode with the first manner, wherein the sixth content and the fifth content are relevant, so as to facilitate further operating of the user, and the processor is configured to switch the display content from the seventh content of the first application to the eighth content of a non-first application when switching the third mode to the first mode with the second manner, so as to facilitate reducing power consumption effectively.

The sixth content of the first application may be generated in two ways below. Similar to the first example described above, the sixth content of the first application may be a part of the fifth content of the first application, but different than a first sub-content of the fifth content, the first sub-content is content displayed in the second mode in the region where the fifth content resides. That is, the sixth content of the first application may be partially the same as the fifth content of the first application.

In addition, alternatively, the sixth content of the first application may be generated based on the fifth content of the first application, wherein the sixth content is different than the fifth content. For example, the first application is a shopping application, and the fifth content of the first application in the second mode is commodity information. When the electronic device switches from the second mode to the first mode with the first manner, the displayed sixth content of the first application is bar codes corresponding to the commodity.

Thus it can be seen that, after switching with the first manner, the sixth content may be the same as or completely different than the fifth content. However, the sixth content and the fifth content are relevant no matter the two are the same or not. In contrast, after switching with the second manner, the eighth content and the seventh content are not the same and are irrelevant.

As a fourth example, suppose that in the second mode, the display 70 displays the fifth content of the first application. The processor is configured to further determine a type of the first application, and based on the type of the first application, the processor controls content displayed after a switching.

When the sensor detects that the electronic device 1 switches from the second mode to the first mode, if the processor further determines that the type of the first application is a continuous type, such as music player, navigation and other applications, then the processor controls the display 70 to display a sixth content of the first application, the sixth content is a part of the fifth content, and it is different than a first sub-content of the fifth content, the first sub-content is content displayed in the second mode in the region where the fifth content resides. For example, the processor further determines that the type of the first application is a continuous type, then the processor controls to display a simplified interface of the first application, in the simplified interface, a part of the complete content is selected to display. For example, the first application is a music player, after switching from the second mode to the first mode, the first content changes into a part of content selected from among a complete content of playback control buttons (comprising play, pause, fast forward, etc.), a playback progress bar, lyrics, album covers, etc., such as the playback control buttons and the playback progress bar. Alternatively, the processor may also control the display 70 to display a sixth content of the first application, the sixth content is generated based on the first content and is different than the fifth content. For example, if the processor determines that the type of the first application is a continuous type, then the processor may also re-generate a simplified interface of the first application. For example, the first application is a navigation application, after switching from the second mode to the first mode, the first content changes into arrow navigation, the arrow navigation here is completely different than a complete navigation content displayed previously.

On the other hand, if the processor determines that the type of the first application is a non-continuous type, then the processor controls the display 70 to display an eighth content of a non-first application, wherein the eighth content of a non-first application is irrelevant to the fifth content of the first application. For example, if the processor determines that the type of the first application is a non-continuous type, then the processor controls the display 70 to display a screen lock interface.

In this way, when the user changes the second mode to the first mode in a case where the current running application is a continuous-type application, there is a high possibility for the user to desire to further operate the electronic device 1, and when the user changes the second mode to the first mode in a case where the current running application is a non-continuous-type application, there is a high possibility for the user to desire to not operate the electronic device any more, thus the processor is configured to switch the display content from the fifth content of the first application to the sixth content thereof in the case where the current running application is a continuous-type application, wherein the sixth content and the fifth content are relevant, so as to facilitate further operating of the user, and the processor is configured to switch the display content from the fifth content of the first application to the eighth content of a non-first application when switching from the second mode to the first mode in the case where the current running application is a non-continuous-type application, so as to facilitate reducing power consumption effectively.

As a fifth example, suppose that in the second mode, the display 70 displays the fifth content of the first application. Different than the processor is configured to further determine a type of the first application in the fourth example, in the fifth example, the processor is configured to further determine a type of an operation that is being current executed, and based on the type of an operation that is being current executed, the processor controls content displayed after a switching. That is to say, even if the type of the application that is currently running is a continuous-type application, but no continuous-type operation (such as executing music playing, executing a navigation, and other operations) is executed currently, then the displaying is still switched to the eighth content of a non-first application.

When the sensor detects that the electronic device 1 switches from the second mode to the first mode, if the processor further determines that the type of the operation is a continuous type, such as executing music playing, executing a navigation and other operations, then the processor controls the display 70 to display a sixth content of the first application, the sixth content is a part of the fifth content, and it is different than a first sub-content of the fifth content, the first sub-content is content displayed in the second mode in the region where the fifth content resides. For example, the processor further determines that the type of the operation is a continuous type, then the processor controls to display a simplified interface of the first application. Alternatively, the processor may also control the display 70 to display a sixth content of the first application, the sixth content is generated based on the fifth content and is different than the fifth content. For example, if the processor determines that the type of the first operation is a continuous type, then the processor may also re-generate a simplified interface of the first application.

On the other hand, if the processor determines that the type of the operation is a non-continuous type, then the processor controls the display 70 to display an eighth content of a non-first application, wherein the eighth content of a non-first application is irrelevant to the fifth content of the first application. For example, if the processor determines that the type of the operation is a non-continuous type, then the processor controls the display 70 to display a screen lock interface.

In this way, when the user changes the second mode to the first mode in the case where the type of an operation that is being currently executed is a continuous type, there is a high possibility for the user to desire to further operate the electronic device 1, and when the user changes the second mode to the first mode in the case where the type of an operation that is being currently executed is a non-continuous type, there is a high possibility for the user to desire to not operate the electronic device any more, thus the processor is configured to switch the fifth content of the first application to the sixth content thereof in the case where the type of an operation that is being current executed is a continuous type, wherein the sixth content and the fifth content are relevant, so as to facilitate further operating of the user, and the processor is configured to switch the fifth content of the first application to the eighth content of a non-first application when switching the second mode to the first mode in the case where the type of an operation that is being currently executed is a non-continuous type, so as to facilitate reducing power consumption effectively.

Figure 27:
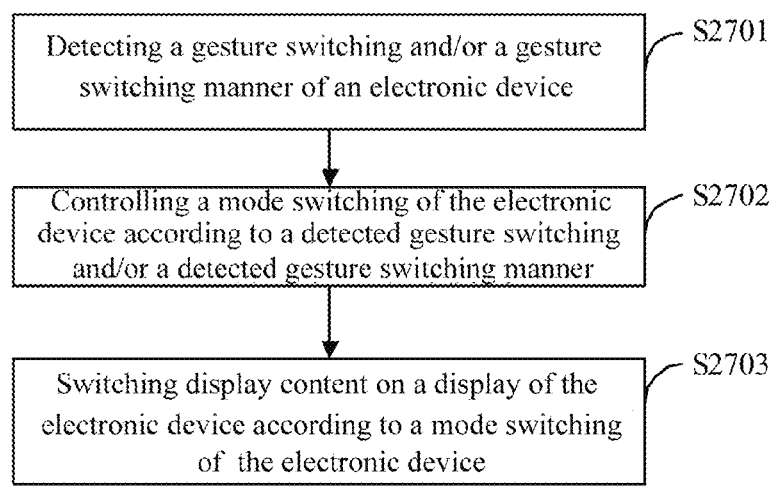
FIG. 27 is a flowchart illustrating a mode switching method according to an embodiment of the sixth implementation of the present disclosure.

Next, the particular process of the mode switching method according to the embodiment of the present disclosure will be described with reference to FIG. 27. As shown in FIG. 27, a first example of the mode switching method according to an embodiment of the present disclosure comprises steps provided below.

In step S2701, a mode switching and/or a mode switching manner of an electronic device is detected. As described above, wherein the electronic device comprises: a first body; a connecting body; and a second body connected to the first body through the connecting body; wherein based on the connecting body, the electronic device has at least three modes, in a first mode the first body and the second body have a first relative positional relationship, in a second mode the first body and the second body have a second relative positional relationship, and in a third mode the first body and the second body have a third relative positional relationship, the first relative positional relationship, the second relative positional relationship, and the third positional relationship are different each other; and the electronic device can switch from the second mode to the first mode with a first manner, and switch from the third mode to the first mode with a second manner. The first manner and the second manner are different. The mode of the electronic device may be detected by a sensor disposed in the first body and/or the connecting body and/or the second body. Thereafter, the process proceeds to step S2702.

In step S2702, a mode switching of the electronic device is controlled according to a detected mode switching or a detected mode switching manner. Thereafter, the process proceeds to step S2703.

In step S2703, display content on a display of the electronic device is switched according to a mode switching of the electronic device.

As a first example, suppose that in the second mode, the display 70 displays the third content. When it is detected that the electronic device 1 switches from the second mode to the first mode with the first manner described above, the display 70 is controlled to switch from displaying the third content to displaying a first content.

Because, as described above, area of a first non-covered part of the display in the first mode is smaller than area of a second non-covered part of the display in the second mode, thus, the first content that can be displayed in the first mode certainly is less than the third content that can be displayed in the second mode. Here, the first content is a part of the third content, and the first content is different than a first sub-content of the third content, the first sub-content is a content displayed in the second mode in the region where the first content resides. That is to say, although the first content is a part of the third content, it is not simply cutting the third content as it is, instead, it is a simplified re-combination of respective items in the third content.

On the other hand, suppose in the first mode, the display 70 displays the first content. When it is detected that the electronic device 1 switches from the first mode to the second mode with the first manner described above, the display 70 is controlled to switch from displaying the first content to displaying the third content.

As a second example, suppose in the third mode, the display 70 displays a fourth content, when it is detected that the electronic device 1 switches from the third mode to the first mode with the second manner described above, the display 70 is controlled to switch from displaying the fourth content to displaying the second content.

Different than that the first content and the third content in the first example are relevant, in the second embodiment, the second content is a predetermined content, and the second content is irrelevant to the fourth content.

On the other hand, suppose in the first mode, the display 70 displays the second content. When it is detected that the electronic device 1 switches from the first mode to the third mode with the second manner described above, the display 70 is controlled to switch from displaying the second content to displaying the fourth content.

As a third example, suppose in the second mode, the display 70 displays the fifth content. When it is detected that the electronic device 1 switches from the second mode to the first mode with the first manner described above, the display 70 is controlled to switch from displaying the fifth content of the first application to displaying a sixth content of the first application. And suppose in the third mode, the display 70 displays a seventh content of the first application. In the third example, what should be focused on is that display content will be different when switching to the first mode with different manners (the first manner or the second manner) in a case where the same application is displayed in the second mode and the third mode. Here, it should be noted that, since area of the second non-covered part of the display in the second mode is smaller than area of the third non-covered part of the display in the third mode, thus even if the same application is displayed in the second mode and third mode, content of the same application will be different slightly. Therefore, in the above, the two are differentiated with the fifth content of the first application and the seventh content of the first application. When it is detected that the electronic device 1 switches from the third mode to the first mode with the second manner described above, the display 70 is controlled to switch from displaying the seventh content of the first application to displaying an eighth content of a non-first application, wherein the eighth content of a non-first application is irrelevant to the seventh content of the first application. For example, the eighth content of a non-first application may be a screen lock interface.

As a fourth example, suppose that in the second mode, the display 70 displays the fifth content of the first application. The mode switching method further comprises determining a type of the first application, and content displayed after a switching is controlled based on the type of the first application.

On the other hand, if it is determined that the type of the first application is a non-continuous type, then the display 70 is controlled to display an eighth content of a non-first application, wherein the eighth content of a non-first application is irrelevant to the fifth content of the first application. For example, if it is determined that that the type of the first application is a non-continuous type, then the display 70 is controlled to display a screen lock interface.

As a fifth example, suppose that in the second mode, the display 70 displays the fifth content of the first application. Different than further determining a type of the first application in the fourth example, in the fifth example, the mode switching method further comprises determining a type of an operation that is being current executed, and content displayed after a switching is controlled based on the type of an operation that is being current executed.

On the other hand, if it is determined that the type of the operation is a non-continuous type, then the display 70 is controlled to display an eighth content of a non-first application, wherein the eighth content of a non-first application is irrelevant to the fifth content of the first application. For example, if it is determined that the type of the operation is a non-continuous type, then the display 70 is controlled to display a screen lock interface.

Hereinbefore, the electronic device according to the embodiment of the present disclosure has been described in detail with reference to the accompany drawings. With the electronic device according to the embodiment of the present disclosure, the electronic device may be switched between three modes in two different ways, and content to be displayed after the switch may be controlled based on the switch manner, so that the usage mode of the electronic device is flexible and the user experience is improved.

The display processing method, the display processing apparatus and the electronic device according to the embodiments of the present disclosure have been described above with reference to FIGS. 1-27.

It should be noted that, in the specification, the terms "comprise", "comprise" and any other variations thereof intend to cover nonexclusive inclusion so that the procedure, the method, the product or the equipment comprising a series of elements comprise not only these elements, but also other elements which are not listed explicitly, or also comprise inherent elements of these procedure, method, product or equipment. In the case that there is no further limitation, elements defined by the expressions "comprise one . . . " do not exclude there being additional identity elements in the procedure, method, product or equipment of the elements.

Further, it should be noted that, in the present specification, the expressions such as "the first . . . unit" and "the second . . . unit" are only for a better description, but not mean that they must be realized as two or multiple units separate from each other. In fact, the units may be realized as one unit as a whole or multiple units as necessary.

Finally, it should be noted that, the above-described series of processes do not only comprise processes executed chronologically in the order mentioned here, and also comprise processes executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and comprise several instructions for causing a computer apparatus (which may be a personal computer, a server, or a network device) to perform the method described in the various embodiments of the present disclosure or certain parts thereof.

In the embodiment of the present disclosure, the module may be realized by software so as to be executed by various processors. For example, an identified executable code module may comprise one or more physical or logical units of the computer instructions, which may, for example, be constructed as an object, a process or a function. Nevertheless, the executable codes of the identified module are not necessary to be located together physically, and may comprise different instructions stored at different locations, which may construct a module and achieve the predetermined purpose of the module when being combined together logically.

When the module is realized by software, considering the existing hardware manufacture process, those skilled in the art may realize its function by corresponding hardware circuits comprising the normal VLSI circuit or the existing semiconductor such as a logical chip or a transistor, or other separate elements, without the consideration of cost. The module may also be realized by a programmable hardware device, such as a field programmable gate array, a programmable array logic, or a programmable logical device, etc.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:

1. A display processing method comprising:
obtaining information from a second application when an interface of a first application is displayed in a predetermined region of a display screen of a display device, wherein the display screen comprises a planar mode and a first folding mode, and wherein the obtaining is performed when the display screen is in the planar mode;
displaying prompt information on the information, on the interface of the first application;
receiving a first operation by a user upon seeing the prompt information, wherein the first operation comprises changing the display screen from the planar mode into the first folding mode;
dividing the predetermined region into a first region and a second region, in response to the first operation; and
displaying at least a part of the interface of the first application in the first region, and displaying an interface of the second application in the second region, wherein the information is displayed in the interface of the second application.

2. The display processing method of claim 1, wherein the dividing the predetermined region into the first region and the second region comprises dividing the predetermined region into the first region and the second region, with a first folding location of the first folding operation as a boundary.

3. The display processing method of claim 1, wherein the display screen further comprises has a second folding mode, a folding direction of which is the same as that of the first folding mode;

the receiving the first operation on the prompt information comprises receiving one of the first folding operation of changing the display screen into the first folding mode and a second folding operation of changing the display screen into the second folding mode;

the dividing the predetermined region into the first region and the second region comprises dividing the predetermined region into the first region and the second region, with a first folding location of the first folding operation as a boundary, when receiving the first folding operation; and dividing the predetermined region into the first region and the second region, with a second folding location of the second folding operation as a boundary, when receiving the second folding operation.

4. The display processing method of claim 1, further comprising:

after displaying at least one part of the interface of the first application in the first region, and displaying the interface of the second application in the second region, receiving a third folding operation of changing the display screen from the first folding mode back into the planar mode, a folding direction of the third folding operation being opposite to that of the first folding operation; and changing the display screen back into the planar mode and displaying the at least a part of the interface of the first application in the predetermined region, in response to the third folding operation.

5. The display processing method of claim 1, further comprising:

after displaying at least one part of the interface of the first application in the first region, and displaying the interface of the second application in the second region, receiving a third folding operation of changing the display screen from the first folding mode back into the planar mode, a folding direction of the third folding operation being opposite to that of the first folding operation; and changing the display screen back into the planar mode and remaining to display the at least a part of the interface of the first application in the first region and to display the interface of the second application in the second region, in response to the third folding operation;

receiving a second operation; and displaying the interface of the first application in the predetermined region, in response to the second operation.

6. The display processing method of claim 1, wherein the relative location relationship between the first region and the second region is preset, and the second region is preset to be a region extended inwards from a first side of the display screen, and the displaying the prompt information on the information comprises displaying the prompt information on the information, at a location corresponding to the preset second region, on the interface of the first application.

7. The display processing method of claim 6, wherein the first region and the second region are prearranged in a direction perpendicular to a display direction of the display screen.

8. A display processing apparatus comprising:

a display screen of a display device, wherein the display screen comprises a planar mode and a first folding mode;

a first receiving unit operative to obtain information from a second application when an interface of a first application is displayed in a predetermined region of the display screen of the display device, and when the display screen is in the planar mode;

a first display processing unit operative to display prompt information on the information, on the interface of the first application;

a second receiving unit operative to receive a first operation by a user upon seeing the prompt information, wherein the first operation is to change the display screen from the planar mode into the first folding mode;

a dividing unit operative to divide the predetermined region into a first region and a second region, in response to the first operation; and a second display processing unit operative to display at least a part of the interface of the first application in the first region, and to display an interface of the second application in the second region, wherein the information is displayed in the interface of the second application.

9. An electronic device, comprising:

a display screen operative to display an interface, wherein the display screen comprises a planar mode and a first folding mode;

a sensor operative to detect an input operation;

a processor operative to obtain information from a second application when an interface of a first application is displayed in a predetermined region of the display screen and when the display screen is in the planar mode; to display prompt information on the information, on the interface of the first application; to receive a first folding operation by a user upon seeing the prompt information, the first folding operation for changing the display screen from the planar mode into the first folding mode; to divide the predetermined region into a first region and a second region, in response to the first folding operation; and to control the display to display at least a part of the interface of the first application in the first region, and to display an interface of the second application in the second region, wherein the information is displayed in the interface of the second application.

10. The electronic device of claim 9 further comprising:

a first body having a first surface and a second surface opposite to each other;

a connecting body having a first surface and a second surface opposite to each other;

a second body connected to the first body through the connecting body, which has a first surface and a second surface opposite to each other;

the display screen is arranged on the first surface of the first body, the first surface of the connecting body and the first surface of the second body; the processor and the memory are arranged on anyone of the first body, the connecting body and the second body, respectively;

in the planar mode, the first body, the connecting body and the second body are located in a same or nearly same plane;

in the first folding mode, the first angle between a surface forming of the first surface of the first body and the first surface of the connecting body and the second body is larger than a threshold, the first region corresponds to the first surface of the first body and the first surface of the connecting body, and the second region corresponds to the first surface of the second body.

11. The electronic device of claim 9, wherein the display screen further comprises a second folding mode, a folding direction of which is the same as that of the first folding mode; and in the second folding mode, the first angle between a surface forming of the first surface of the connecting body and the first surface of the second body and the first body is larger than a threshold, the first region corresponds to the first surface of the first body, and the second region corresponds to first surface of the second body and the first surface of the connecting body.

* * * * *